(12) United States Patent
Lee et al.

(10) Patent No.: US 7,113,632 B2
(45) Date of Patent: Sep. 26, 2006

(54) METHOD OF AND APPARATUS FOR RECTIFYING A STEREOSCOPIC IMAGE

(75) Inventors: Delman Lee, Kowloon (HK); Graham Roger Jones, Oxfordshire (GB)

(73) Assignee: Sharp Kabushiki Kaisha, Osaka (JP)

( * ) Notice: Subject to any disclaimer, the term of this patent is extended or adjusted under 35 U.S.C. 154(b) by 582 days.

(21) Appl. No.: 10/081,916

(22) Filed: Feb. 20, 2002

(65) Prior Publication Data

US 2003/0156751 A1    Aug. 21, 2003

(30) Foreign Application Priority Data

Feb. 23, 2001    (GB) .................................. 0104599.6

(51) Int. Cl.
*G06K 9/00* (2006.01)
(52) U.S. Cl. ...................... 382/154; 382/294; 382/254; 382/255; 382/276; 382/298
(58) Field of Classification Search ................ 382/154, 382/294, 284, 254, 255, 276, 296, 298; 348/42–47, 348/51; 356/12, 611; 345/418, 419
See application file for complete search history.

(56) References Cited

U.S. PATENT DOCUMENTS

| 5,142,357 | A | * | 8/1992 | Lipton et al. ................. 348/48 |
| 5,142,642 | A |   | 8/1992 | Sudo ........................... 358/88 |
| 5,917,937 | A | * | 6/1999 | Szeliski et al. ............. 382/154 |
| 6,011,863 | A |   | 1/2000 | Roy ............................ 382/154 |
| 6,125,198 | A | * | 9/2000 | Onda .......................... 382/154 |
| 6,191,809 | B1 |  | 2/2001 | Hori et al. .................... 348/45 |
| 6,608,323 | B1 | * | 8/2003 | Marks et al. ................. 257/40 |

FOREIGN PATENT DOCUMENTS

| EP | 0 563 737 A1 | 3/1993 |
| EP | 1 100 048 A1 | 5/2001 |
| JP | 02-058993 | 2/1990 |
| JP | 07-050856 | 2/1995 |

OTHER PUBLICATIONS

Courtney et al., A Hardware Architecture for Image Rectification and Ground Plane Obstacle Detection, 1992, International Conference on Pattern Recognition, pp. 23-26.*
Papadimitriou et al., Epipolar Line Estimation and Rectification for Stereo Image Pairs, 1996, IEEE Transaction of Image Processing, vol. 5, pp. 672-676.*

(Continued)

*Primary Examiner*—Bhavesh M. Mehta
*Assistant Examiner*—John Strege
(74) *Attorney, Agent, or Firm*—Renner, Otto, Boisselle & Sklar, LLP

(57) ABSTRACT

A method of rectifying a stereoscopic image consisting of left and right captured images comprises determining left and right rectification transformations. According to one aspect of the invention, statistics of the parameters of the stereoscopic image capture device used to capture the left and right images are used in the determination of the left and/or right rectification transformation.

According to another aspect of the invention, the left and right rectification transformations are constrained to correspond to a transformation to a virtual alignment to a parallel camera set-up.

Once the left and right rectification transformations have been determined they are preferably used to rectify the left and right images to eliminate, or substantially eliminate, vertical disparity from the rectified image pair. The left and right rectified images may then be displayed on a stereoscopic display device for viewing by an observer, or they may alternatively be stored for later use.

42 Claims, 13 Drawing Sheets

OTHER PUBLICATIONS

Ayache et al., Rectification of Images for Binocular and Trinocular Stereovision, 1998,International Conference of Pattern Recognition, pp. 11-16.*

Bing Kang et al., An Active Miltibaseline Stereo System with Real-Time Image Acquisition, 1994, Tech. Rep. CMU-CS-97-167, School of Computer Science, Carnegie Mellon University, pp. 1-23.*

Search Report dated Oct. 11, 2001 for British Application No. GB 0104599.6.

A. Fusiello, et al. —"Rectification with Unconstrained Stereogeometry"; Proceedings of British Machine Vision Conference, (1997), pp. 400-409.

Hartley—"Computing Matched-Epipolar Projections"; Conference on Computer Vision and Pattern Recognition; (1993), pp. 549-555.

Hartley—"Theory and Practice of Projective Rectification"; International Journal of Computer Vision, (1998).

F. Isgro, et al.—"Projective Rectification without Epipolar Geometry"; Conference on Computer Vision and Pattern Recognition; (1999), pp. 94-99.

C. Loop, et al.—"Computer Rectifying Harmographies for Stereo Vision"; Tech Rep MSR-TR-99-21; (1999), Microsoft Research.

European Search Report for corresponding Application No. 02251251.1, dated Apr. 13, 2006.

* cited by examiner $f_L = f_R$ $f_L \neq f_R$     $f_L \neq f_R$

METHOD OF AND APPARATUS FOR RECTIFYING A STEREOSCOPIC IMAGE

BACKGROUND OF THE INVENTION

1. Field of the Invention

The present invention relates a method of rectifying a stereoscopic image pair, and in particular relates to a method of determining a pair of rectification transformations for rectifying the two captured images making up the image pair so an to substantially eliminate vertical disparity from the rectified image pair. The invention is particularly applicable to rectification of a stereoscopic image pair intended for display on a stereoscopic image display device for direct viewing by an observer. The invention also relates to an apparatus for rectifying a stereoscopic image pair.

2. Description of the Related Art

The principles of stereoscopic displays are well known. To create a stereoscopic display, two images are acquired using a stereoscopic image capture device that provides two image capture devices. One image capture device (known as the "left image capture device") captures an image corresponding to the image that would be seen by the left eye of an observer, and the other image capture device (known as the "right image capture device") captures an image corresponding to the image that would be seen by the right eye of an observer. The two images thus acquired are known as a pair of stereoscopic images, or stereoscopic image pair. When the two images are displayed using a suitable stereoscopic display device, a viewer perceives a three-dimensional image. The stereoscopic image capture device may contain two separate image capture devices, for example such as two cameras. Alternatively, the stereoscopic capture image device may contain a single image capture device that can act as both the left image capture device and the right image capture device. For example, a single image capture device, such as a camera, may be mounted on a slide bar so that it can be translated between a position in which it acts as a left image capture device and a position in which it acts as a right image capture device. As another example, the stereoscopic image capture device may contain a single image capture device and a moving mirror arrangement that allows the image capture device to act either as a left image capture device, or a right image capture device.

One problem with conventional stereoscopic displays as that stereoscopic images can be uncomfortable to view, even on high quality stereoscopic display devices. One cause of discomfort is the presence of vertical disparity within a stereoscopic image pair. Vertical disparity means that the image of an object in one of the stereoscopic images has a different vertical position than the image of the same object in the other stereoscopic image. Vertical disparity arises owing to many kinds of mis-alignment of the camera systems, and causes discomfort to a viewer. Image rectification is a process for eliminating vertical disparity between the two images of a stereoscopic image pair, so making the resultant stereoscopic image more comfortable to view.

The origin of vertical disparity within a stereoscopic image pair will now be explained with reference to a simplified model that uses a camera set up consisting of two pin-hole cameras, one for recording the image that would be seen by the left eye of the observer and the other for recording the image that would be seen by the right eye of an observer. The left pin-hole camera—that is, the pin-hole camera for recording the image that would be seen by the left-eye—consists of a pin-hole 1L and an imaging plane 2L, and the right pin-hole camera—that is, the pin-hole camera for recording the image that would be seen by the right eye—also comprises a pin-hole 1R and an imaging plane 2R.

In the two camera set-up of FIG. 1, the base line 3 is the distance between the pin-hole 1L of the left camera and the pin-hole 1R of the right camera. The optical axis of each camera is the axis that is perpendicular to the imaging plane of the camera and that passes through the pin-hole of the camera. For each camera, the "principal point" is the point 5L, 5R in the imaging plane 2L, 2R of the camera that is nearest to the pin-hole 1L, 1R of the camera. Finally, the effective focal length of each camera is the distance $f_L$, $f_R$ between the pin-hole of a camera and the principal point of the camera.

FIGS. 2(a) and 2(b) illustrate an ideal stereoscopic recording set up. In an ideal set up, the left and right cameras are identical so that, inter alia, the focal length of the left camera is identical to the focal length of the right camera and the principal point of the left camera is identical to the principal point of the right camera. Furthermore, in an ideal camera set up the optical axis of the left and right cameras are parallel, and are also perpendicular to the base line. For brevity, a camera set up such as shown in FIG. 2(a) or 2(b) will be referred to as a "parallel camera set up".

If a stereoscopic image pair is captured with two identical cameras, or other recording devices, arranged precisely in a parallel camera set up, vertical disparity will not occur between the two images of the stereoscopic image pair. However, vertical disparity is introduced into the stereoscopic image pair when the image pair is captured with a non-ideal camera set up. In practice, a typical low-cost stereoscopic camera system is only an approximation to a parallel camera set up. The two cameras in a typical low-cost stereoscopic camera system will in practice have unmatched focal lengths and unmatched principal points, even if the two cameras are nominally identical. Furthermore, the optical axes of the two cameras are likely not to be exactly orthogonal to the base line, and are likely not to be parallel to one another. Such a typical stereoscopic camera system is illustrated in FIG. 2(c). Stereoscopic images captured using a camera set up having the defects shown in FIG. 2(c) will contain vertical disparity.

The focal length and principal point are sometimes called the "intrinsic" camera parameters, since these parameters relate to a single camera. The rotation and translation are referred to as "extrinsic" camera parameters, since they relate to the way in which one camera of a stereo camera set up is aligned relative to the other camera.

It is known to process stereoscopic images captured using a non-parallel camera set up, in order to reduce vertical disparity. This process is known as "rectification". If the rectification process is completely effective, vertical disparity will be eliminated—and a high quality stereoscopic display can be obtained even though the original images were captured using a non-parallel camera alignment. The rectification process can be thought of as a process for virtually aligning the two cameras, since the rectified images correspond to images that would have been acquired using a parallel camera set-up (assuming that the rectification process was carried out correctly).

FIG. 3(a) is a block flow diagram of a prior art rectification process. At step 11 a stereoscopic image pair is captured, and a correspondence detection step is then carried out at step 12 to detect pairs of corresponding points in the two images (that is, each pair consists of a point in one image and a corresponding point in the other image). If there is vertical disparity between the two images, this will become apparent during the correspondence detection step.

At step 13 details of the rectification procedure required to eliminate the vertical disparity between the two stereoscopic images are determined, from the results of the correspondence detection step. At step 14 a pair of rectifying transformations is determined, one transformation for rectifying the left image and one transformation for rectifying the right image. At step 15, the left and right images are operated on by the rectifying transformation determined for that image at step 14; this is generally known as the "warping step", since the left and right images are warped by the rectifying transformations. The result of step 15 is to produce a rectified image pair at step 16. If the rectifying transformations have been chosen correctly, the rectified image pair should contain no vertical disparity. Finally, the rectified images can be displayed on a stereoscopic imaging device at step 17.

The rectifying transformations determined at step 14 will depend on the geometry of the camera set up. Once suitable rectifying transformations have been determined from one captured image pair, therefore, it is not necessary to repeat steps 12, 13 and 14 for subsequent image pairs acquired using the same camera set-up. Instead, a subsequent captured image pair acquired using the same camera set-up can be directly warped at step 15 using the rectifying transformations determined earlier.

Apart from the elimination of vertical disparity within a stereoscopic image pair, rectification is also used in the prior art to simplify subsequent stereoscopic analysis. In particular, the stereoscopic matching or correspondence problem is simplified from a two-dimensional search to a one-dimensional search. The rectifying transformations for the left and right images are chosen such that corresponding image features can be matched after rectification.

Prior art rectification techniques of the type shown generically in FIG. 3(a) fall into two main types. The first type of rectification process requires knowledge of the "camera parameters" of the camera setup. The camera parameters include, for example, the focal lengths of the two cameras, the base line, the principal point of each camera and the angle that the optical axis of each camera makes with the base line. Knowledge of the camera parameters is used to estimate appropriate rectifying transformations. FIG. 3(b) is a block flow diagram for such a prior art rectification process. It will be seen that the method of FIG. 3(b) differs from that of FIG. 3(a) in that knowledge of the camera parameters is used at step 13 to estimate the rectifying transformations.

Prior art rectification methods of the type shown schematically in FIG. 3(b) are disclosed in, for example, N. Ayache et al in "Rectification of images for binocular and trinocular stereovision" in "International Conference of Pattern Recognition" pp11–16 (1998), by P. Courtney et al in "A Hardware Architecture for Image Rectification and Ground Plane Obstacle Detection" in "International Conference on Pattern Recognition", pp23–26 (1992), by S. Kang et al in "An Active Multibaseline Stereo System with Real-Time Image Acquisition" Tech. Rep. CMU-CS-94-167, School of Computer Science, Carnegie Mellon University(1994),and by A. Fusielloetal, "Rectification with Unconstrained Stereogeometry" in "Proceedings of British Machine Vision Conference" pp400–409 (1997).

Prior art rectification methods of the type shown schematically in FIG. 3(b) have the disadvantage in that they are only as reliable as the camera parameters used to estimate the rectifying transformations. In principle, if the exact camera parameters are used to estimate the rectifying transformations, then the vertical disparity can be completely eliminated. In practice, however, the camera parameters will not be known exactly and, in this case, the rectifying transformations will be chosen incorrectly. As a result, the rectified image pair will still contain vertical disparity.

An alternative prior art rectification method is illustrated schematically in FIG. 3(c). This method does not use the camera parameters to determine the appropriate rectifying transformations. Rectification that does not involve use of camera parameters is sometimes referred to as "projective rectification".

In projective rectification, there are degrees of freedom in the choice of the rectifying transformations. Most prior art methods of projective rectification use some heuristics to eliminate these degrees of freedom so as to eliminate all but one pair of rectifying transformations; the one remaining pair of rectifying transformations are then used to rectify the left and right images. The heuristic minimises image distortion, as measured in some way, in the rectified image pair. This prior art method has the feature that the pair of rectifying transformations that is determined does not necessarily correspond to virtually aligning the cameras to give a parallel camera set up. Where the rectified image pair produced by the rectification process is intended for stereoscopic analysis such as stereoscopic correspondence, it is not necessary for the rectifying transformation to correspond to a virtual alignment that gives a parallel camera set-up. However, where the rectified stereoscopic image pair is to be viewed on a stereoscopic imaging device, it is desirable that the rectifying transformation does correspond to a virtual alignment that gives a parallel camera set-up since, if the rectifying transformation does not correspond to a virtual alignment that gives a parallel camera set-up, the perceived three-dimensional image could appear distorted from what would have been observed using a parallel camera set up. For example a rectifying transformation that transforms straight lines in a captured image into curved lines in the rectified image does not correspond to a virtual alignment that gives a parallel camera set-up.

U.S. Pat. No. 6,011,863 discloses a method of the general type shown in FIG. 3(c) in which an original captured image is projected onto a non-planar surface, so that straight lines in the captured image are transformed to curved lines in the rectified image. As noted above, this transformation does not correspond to a parallel camera alignment.

D. Papadimitriou et al disclose, in "Epipolar Line Estimation and Rectification for Stereoimage Pairs", "IEEE Transaction of Image Processing", Vol. 5, pp672–676 (1996) a rectification method in which the camera rotation is restricted to be about a particular axis only. With such a restricted camera geometry, all the camera intrinsic and extrinsic parameters can be estimated from the correspondence detection. The rectifying transformations can then be determined from the camera parameters. This method is limited to one specific camera geometry.

R. Hartley et al disclose, in "Computing matched-epipolar projections" in "Conference on Computer Vision and Pattern Recognition" pp549–555 (1993), a rectification method using the heuristic that (i) the rectifying transformation for one of the images is a rigid transformation at a specific point (typically the centre of the image) and (ii) the horizontal disparity is minimised. Similar heuristics are used in methods disclosed by R. Hartley in "Theory and Practice of Projective Rectification" in "International Journal of Computer Vision" (1998) and by F. Isgro et al in "Projective Rectification Without Epipolar Geometry" in "Conference on Computer vision and Pattern Recogniton" pp94–99 (1999).

These methods have the disadvantage that the rectifying transformations do not necessarily correspond to a virtual alignment to a parallel camera set-up.

C. Loop et al disclose in, "Computer Rectifying Harmographies for Stereo Vision" "Tech Rep MSR-TR-99-21, Microsoft Research (1999), a rectifying method that uses an heuristic that maintains the aspect ratio and perpendicularity of two lines formed by the mid points of the image boundaries. This rectifying transformations determined by this method again do not necessarily correspond to a virtual alignment to a parallel camera set-up.

Japanese patent Nos. 2058993 and 7050856 describe correcting a stereoscopic video signal to compensate for differences in brightness or colour balance between the left eye video signal and the right eye video signal. These documents do not relate to correcting for vertical disparity between the left eye image and the right eye image.

U.S. Pat. No. 6,191,809 describes correcting for optical misalignment of the two images of a stereoscopic image pair (for example produced by a stereo electronic endoscope). The citation discloses processing the image data electronically by digitising the two images, and digitally rectifying the images by means of a vertical image shift and/or image size change and/or image rotation in order to correct for any mis-alignment between the two images. However, no details of the rectifying transformations are given.

EP-A-1 100 048, which was published after the priority date of this application, describes a method of processing an image pair that includes an image rectification step. However, no details of the image rectification step are given.

SUMMARY OF THE INVENTION

A first aspect of the present invention provides a method of rectifying a stereoscopic image comprising first and second images captured using a respective one of first and second image capture devices, the first and second image capture devices forming a stereoscopic image capture device, the method comprising the step of: determining first and second rectification transformations for rectifying a respective one of the first and second images so as to reduce vertical disparity; wherein the method comprises using statistics of the parameters of the stereoscopic image capture device in the determination of the first and/or second rectification transformations.

The terms "first image capture device" and "second image capture device" are used herein for ease of explanation. It should be understood, however, that the invention may be applied to a stereoscopic image that was captured using a stereoscopic image capture device having a single image capture device that can act as both the first image capture device and the second image capture device as described above.

When the first and second rectification transformations are applied to the first and second images, vertical disparity in the transformed images is eliminated or at least substantially reduced. The rectifying transformations effectively adjust the orientations of the image capture devices, so that the transformed images are images that would have been obtained if the two image capture devices were identical to one another and were correctly aligned relative to one another.

In prior art methods that use knowledge of the parameters of the image capture devices to determine the rectifying transformations, it is assumed that the parameters are known exactly. If the parameters used in the determination of the rectification transformations are not exactly the true parameters of the image capture system, however, the resultant rectification transformations will not eliminate vertical disparity from the rectified image pair. The present invention overcomes this problem by using statistics for the parameters of the image capture devices in the determination of the rectification transformations, rather than assuming that the exact parameters are known for the particular image capture devices used to obtain a stereoscopic image pair. The elimination of vertical disparity from the rectified image pair is therefore accomplished more efficiently in the present invention than in the prior art.

Each rectification transformation may comprise a horizontal shear and scaling component, and the statistics of the parameters of the stereoscopic image capture device may be used in the determination of the horizontal shear and scaling component of the first and/or second rectification transformation.

The method may comprise the steps of: determining the first and second rectification transformations; varying the statistics of the parameters of the stereoscopic image capture device; re-determining the first and second rectification transformations; and rectifying the first and second images using a respective one of the re-determined first and rectification transformations. This allows a user to alter the parameters of the image capture devices used to determine the rectification transformations.

The method may comprise the further steps of: rectifying at least part of the first image and at least part of the second image using a respective one of the initially-determined first and second rectification transformations; and displaying the rectified parts of the first and second images on the stereoscopic display device. This allows a user to monitor how satisfactory the initial rectification transformations are. Moreover, if this step is carried out on only part of the first and second images the required processing power is reduced.

The method may comprise the further steps of: rectifying at least part of the first image and at least part of the second image using a respective one of the initially-determined first and second rectification transformations; displaying the rectified parts of the first and second images on the stereoscopic display device, and varying the statistics of the parameters of the stereoscopic image capture device on the basis of the display of the rectified parts of the first and second images. If the initial rectification transformations are not satisfactory, a user is able to vary the parameters used to determine the rectification transformations.

The statistic of the parameters of the stereoscopic image capture device may relate to parameters of the first image capture device and/or to parameters of the second image capture device. These are known as "intrinsic" parameters and are a measure of how the first image capture device differs from the second image capture device.

The statistics of the parameters of the stereoscopic image capture device may comprise the mean of the focal length of the first and second image capture devices, and they may comprise the standard deviation of the focal length of the first and second image capture devices.

The statistics of the parameters of the stereoscopic image capture device may comprise the mean of the principal point of the first and second image capture devices, and they may comprise the standard deviation of the principal point of the first and second image capture devices.

The statistics of the parameters of the stereoscopic image capture device may relate to the alignment of the first image capture device relative to the second image capture device. These are known as "extrinsic" camera parameters.

The statistics of the parameters of the stereoscopic image capture device may comprise the mean of the rotation of the optical axis of the first image capture device relative to the optical axis of the second image capture device, and they may comprise the standard deviation of the rotation of the optical axis of the first image capture device relative to the optical axis of the second image capture device.

The first and second rectification transformations may be determined so as correspond to a virtual alignment to a parallel camera set-up.

A second aspect of the invention provides a method of rectifying a stereoscopic image comprising first and second images captured using first and second image capture devices, the first and second image capture devices forming a stereoscopic image capture device, the method comprising the step of determining first and second rectification transformations for rectifying a respective one of the first and second images so as to reduce vertical disparity; wherein the method comprises determining the first and second rectification transformation so that the first and second rectification transformations correspond to a virtual alignment to a parallel camera set-up.

If the rectifying transformations do not correspond to a virtual alignment to a parallel camera set-up, the resultant three-dimensional image can appear distorted; for example, straight lines in the original object can appear as curved lines in the resultant three-dimensional image. Where the rectified image is intended to be displayed for direct viewing by an observer, such distortion means that the observer will experience discomfort when viewing the rectified image. The present invention prevents the possibility of such distortion, by ensuring that the rectifying transformations correspond to a virtual alignment to a parallel camera set-up.

The method may further comprise the step of using statistics of the parameters of the image capture device in the step of determining the first and second rectification transformations. Rectification transformations that are possible, but unlikely, can be eliminated according to this embodiment of the invention.

The step of determining the first and second rectification transformations may comprise: determining a first component of each of the first and second rectification transformations, the first component of the first rectification transformation and the first component of the second rectification transformation substantially eliminating vertical disparity from the rectified image pair; and determining a second component of each of the first and second rectification transformations so that the first and second rectification transformations correspond to a virtual alignment to a parallel camera set-up. The statistics of the parameters of the stereoscopic image capture device may be used in the step of determining the second components of the first and second rectification transformations.

The statistics of the parameters of the stereoscopic image capture device may relate to the alignment of the first image capture device relative to the second image capture device.

The first image and second image may comprise a still stereoscopic image. Alternatively, the first image and second image may comprise a frame of a stereoscopic video image.

The method may comprise: determining first and second rectification transformations for a first frame of the stereoscopic video image using a method described above; and rectifying subsequent frames of the stereoscopic video image using the first and second rectification transformations determined for the first frame of the stereoscopic video image. This reduces the processing power required.

The method may alternatively comprise the steps of: determining first and second rectification transformations for a first frame of the stereoscopic video image according to a method as defined above; rectifying first to $N^{th}$ frames of the stereoscopic video image using the first and second rectification transformations determined for the first frame of the stereoscopic video image; determining first and second rectification transformations for an $(N+1)^{th}$ frame of the stereoscopic video image; and rectifying $(N+1)^{th}$ to $(2N)^{th}$ frames of the stereoscopic video image using the first and second rectification transformations determined for the $(N+1)^{th}$ frame of the stereoscopic video image. This ensures that any error in determining the rectification transformations for a particular frame will affect only a limited number of frames of the stereoscopic video image.

The method may alternatively comprise the steps of: determining first and second rectification transformations for each frame of the stereoscopic video image according to a method as defined above; and rectifying each frame of the stereoscopic video image using the first and second rectification transformations determined for the that frame. This ensure that any error in determining the rectification transformations for a particular frame will affect only that frame of the stereoscopic video image.

The method may comprise the further step of rectifying the first and second captured images using a respective one of the first and second rectification transformations.

The method may comprise the further step of displaying the first and second rectified images on a stereoscopic display device for viewing by an observer.

A third aspect of the present invention provides an apparatus for rectifying a stereoscopic image comprising first and second images captured using a respective one of first and second image capture devices, the first and second image capture devices forming a stereoscopic image capture device, the apparatus comprising:

means for determining first and second rectification transformations for rectifying a respective one of the first and second images so as to reduce vertical disparity using statistics of the parameters of the stereoscopic image capture device in the determination of the first and/or second rectification transformations.

A fourth aspect of the present invention provides an apparatus for rectifying a stereoscopic image comprising first and second images captured using first and second image capture devices, the first and second image capture devices forming a stereoscopic image capture device, the apparatus comprising:

means for determining first and second rectification transformations for rectifying a respective one of the first and second images so as to reduce vertical disparity, the first and second rectification transformations corresponding to a virtual alignment to a parallel camera set-up.

The apparatus may further comprise means for rectifying the first and second captured images using a respective one of the first and second rectification transformations.

The apparatus may comprise a programmable data processor.

A fifth aspect of the present invention provides a storage medium containing a program for the data processor of an apparatus as defined above.

BRIEF DESCRIPTION OF THE DRAWINGS

Preferred features of the present invention will now be described by way of illustrative example with reference to the accompanying figures, in which.

DESCRIPTION OF THE PREFERRED EMBODIMENTS

Figure 5:
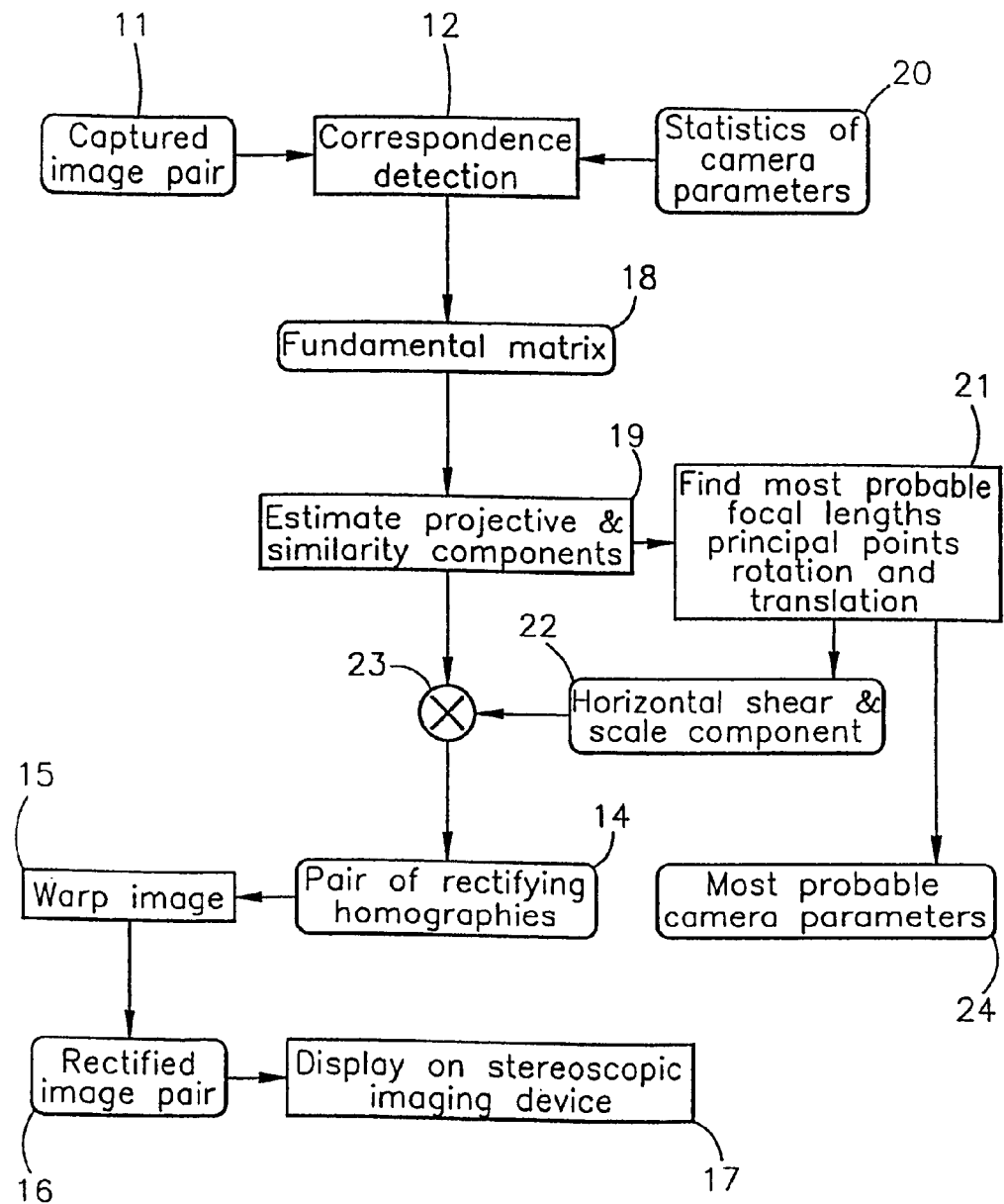
FIG. 5 is a schematic flow diagram of a rectification method incorporating a first embodiment of the present invention.

FIG. 5 is a schematic flow diagram of a method incorporating to a first embodiment of the present invention. FIG. 5 illustrates an entire rectification process, from initial capture of the image pair to display of the rectified image on a suitable stereoscopic imaging device. The determination of the rectification transformations in FIG. 5 is carried out according to the present invention.

The method of FIG. 5 is intended for use with a pair of captured images that form a stereoscopic image pair, and this pair of images forms one input to the method. Statistics of parameters of the set-up of the stereoscopic image capture device used to capture the pair of images (hereinafter referred to as the "camera parameters" for convenience) form the other input. According to the first aspect of the invention, the statistics of the camera parameters are used in the determination of the rectification transformations. (Mathematically the rectification transformations are homographies, which are linear projective transformations that preserve straightness and flatness, but the general term rectification transformations will generally be used herein.)

A suitable image capture device for use with the method of FIG. 5 is a stereo-camera consisting of a pair of digital cameras although, in principle, any stereoscopic image capture device can be used. An example of a suitable stereoscopic display device for displaying the stereoscopic image is an auto-stereoscopic display of the type disclosed in European Patent Publication EP-A-0 726 48, although other imaging devices may be used.

Figure 4A:
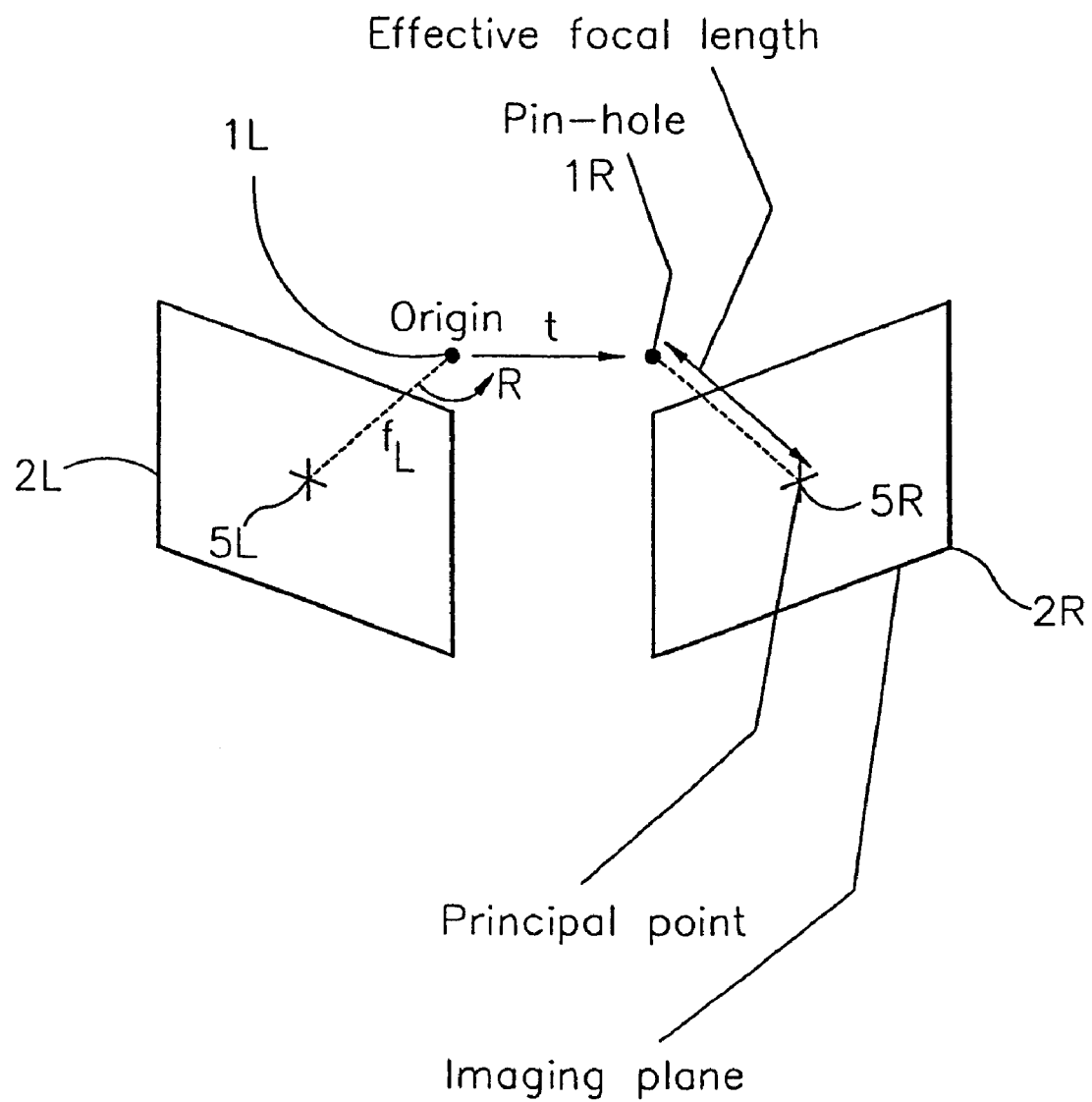
FIGS. 4(a) and 4(b) illustrate the notation used to describe the camera set up.

The co-ordinate system used in the description of the present invention is shown in FIG. 4(a). In FIG. 4(a) the two cameras forming the stereoscopic camera are depicted as pin-hole cameras for simplicity. The origin of the co-ordinate system is chosen to be the pin-hole of one camera, in this example the pin-hole 1L of the left camera. The operation t is the translation required to translate the pin-hole 1L of the left camera onto the pin-hole 1R of the right camera. The operation R is the rotation required, once the pin-hole 1L of the left camera has been translated to be coincident with the pin-hole 1R of the right camera, to make the optical axis 4L of the left camera coincident with the optical axis 4R of the right camera. The operation R may be represented by a 3×3 rotation matrix, and the operation t can be represented by a translational 3-vector.

Figure 4B:
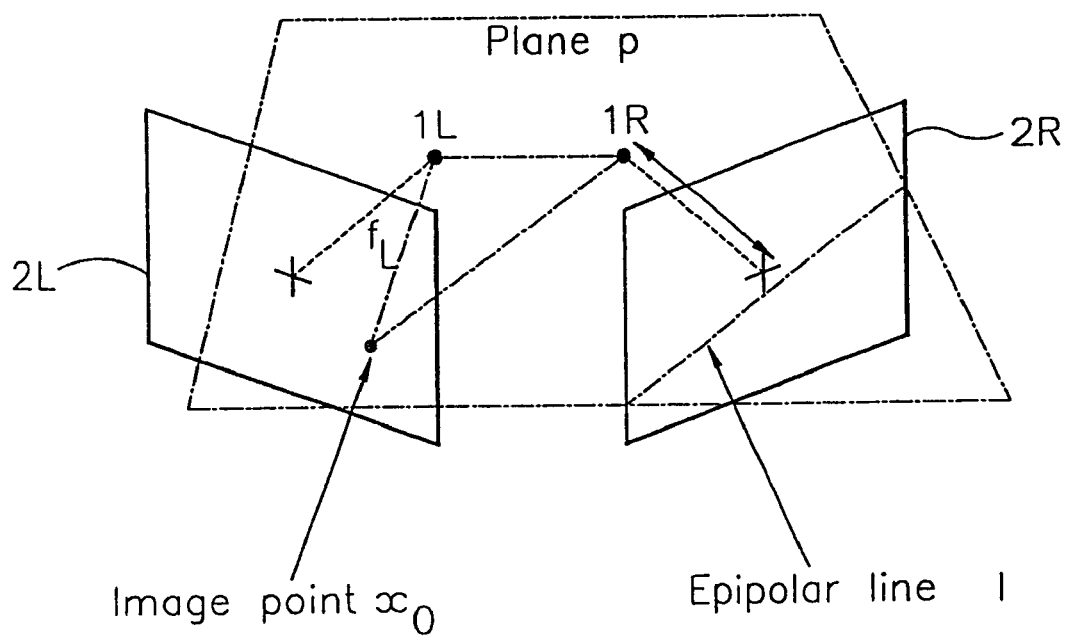

The epipolar geometry of a two camera set-up is illustrated in FIG. 4(b). The pin-holes 1L, 1R of the left and right camera and an image point $x_0$ in the imaging plane 2L of the left camera define a plane p. The dot-dashed lines shown in FIG. 4(b) all lie in the plane p. The intersection of the plane p with the imaging plane 2R of the right camera defines a line l known as the "epipolar line". The right image point corresponding to the left image point $x_0$ (this is the image point formed in the imaging plane 2R of the right camera that corresponds to the point in the object that gives rise to the image point $x_0$ in the imaging plane of the left camera) must lie on the epipolar line l.

Figure 10:
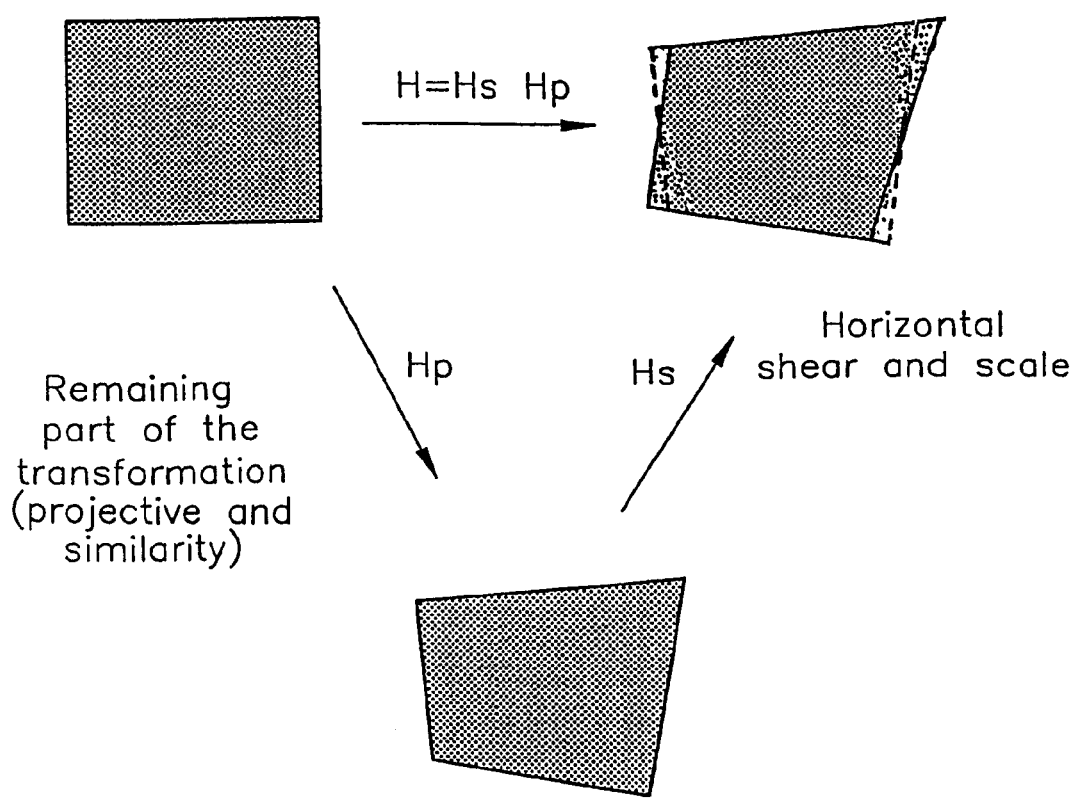
FIG. 10 is a schematic illustration of the decomposition of a rectifying transformation into projective similarity components and horizontal shear and scaling components.

The rectifying transformation for the left or right image can be decomposed into two parts. The first part, denoted by $H_p$, contains the projective and similarity components of the transformation. The second part of the transformation, denoted by $H_s$, contains the horizontal shear and horizontal scaling components. The overall transformation is a combination of the projective and at similarity component and the horizontal shear and scaling component. This is shown schematically in FIG. 10.

At step 11 of the method of FIG. 5, a stereoscopic image pair consisting of a left image and a right image pair is captured with a stereoscopic camera set-up. This step corresponds generally to step 11 of the methods of FIGS. 3(a) to 3(c), except that the invention requires use of a camera set-up whose statistics of intrinsic and extrinsic parameters of the camera set-up are capable of determination in some way, for example from measurements made during manufacture.

At step 12, pixel correspondences between the left and right images are detected using any standard technique, and at step 18 these correspondences are used to compute the 'Fundamental' matrix relating the two images. Steps 12 and 18 correspond generally to steps 12 and 18 of the methods of FIGS. 3(a) to 3(c), At step 19, the correspondence information is used to determine a component of the rectification transformations (the "projective and similarity components") which will be used to rectify the two images. This component of the overall rectification transformations is intended to remove vertical disparity from the rectified image pair. However, this component of the rectification transformations does not necessarily result in transformations that relate to a virtual alignment to a parallel camera set-up. If the images were processed using only this component of the rectification transformations, distortion of the images could occur and the rectified image would be uncomfortable for an observer to view.

At steps 21 and 22, another component of the overall rectification transformations is determined. This component does not itself cause any change to the vertical alignment of the rectified images that would be obtained by transforming the captured image pair using just the first component of the rectification transformation. Its effect is rather to make the overall rectification transformations correspond to a virtual alignment to a parallel camera set-up.

In general, there will be more than one possible solution for the component chosen at step 22. Different possible solutions correspond to different camera parameters. Steps 21 and 22 make use of the camera statistics to select the most probable solution.

Different possible solutions to step 22 correspond to different camera parameters. Once the most probable solution to step 22 has been determined, the set of camera parameters corresponding to this solution is the most probable set of camera parameters. Thus, the most probable camera parameters are obtained from the most probable solution to step 22, and may be output to an operator at step 24.

Steps 21 and 22 in the method of FIG. 5 relate to the determination of a component of the transformation that acts effectively in only the horizontal dimensions and is known as the "horizontal shear and scale" component. Shearing represents distortion of the image in the horizontal direction without having any effect on the image in the vertical direction. This could be, for example, transferring the image aspect from rectangular to trapezoidal with the same vertical dimension, although the shearing step might be more complicated than this. Horizontal scaling simply represents scaling the horizontal size of the image.

Once the projective and similarity component of the NJ transformation, and the horizontal shear and scaling component of the transformation have been determined, they are combined at step 23, to produce the pair of rectifying transformations at step 14.

Once the rectification transformations have been determined, they may be used immediately, or they may be output and/or stored for subsequent use. When the rectification transformations are used, they are used to warp the captured image pair in a conventional manner at step 15, to produce a rectified image pair at step 16. The end product is a rectified image pair, with no, or substantially no, vertical disparity, which should be much more suitable for comfortable stereoscopic viewing than the original captured image pair.

The rectified image pair may be displayed on a suitable stereoscopic display device at step 17, for direct viewing by an observer. Alternatively, the rectified image pair can be stored for future use.

In one prior art technique, as noted above, the rectifying transformations are determined from camera parameters, such as the focal lengths and principal points of the two cameras. As also noted above, if the camera parameters used to estimate the rectification transformations are not exactly equal to the true camera parameters, the resultant rectification transformations are incorrect. This is because the horizontal shear and scaling component of the rectification transformations are determined using the camera parameters, so that use of incorrect values of the camera parameters leads to an incorrect determination of the horizontal shear and scale components of the left and right rectification transformations.

In the embodiment shown in FIG. 5 of the application, the invention makes use of statistics of the camera parameters to ensure that the determined horizontal shear and scale components of the rectification transformations are as close as possible to the true horizontal shear and scale components. The camera statistics may include, for example, one or more of the mean and standard deviation of the focal length of the cameras, the mean and standard deviation of the principal point of the cameras, the mean and standard deviation of the rotation R between the optical axis of one camera and the optical axis of the other camera, and the mean and standard deviation of the translation t between the pin-holes of the two cameras. The camera statistics may be collected, for example, during the manufacture of the individual cameras and their assembly into stereo camera set-ups. The camera statistics are input at step 20.

Each possible pair of rectification transformation will correspond to some particular values of the camera parameters. Thus, by assigning probabilities to the camera parameters, probabilities are also assigned to each possible pair of rectification transformations. Step 21 of the method of FIG. 5 attempts to find the pair of rectification transformations that is most probable in view of the statistics of the camera parameters. This can be done by, for example, using the mean values of the camera parameters as a starting point, and iteratively changing the values of the camera parameters to find the most probable set of camera parameters. Once the most probable set of camera parameters has been found, the horizontal shear and scale components of the pair of rectifying transformations corresponding to this most probable set of camera parameters is determined at step 22. At step 23, the horizontal shear and scale components determined at step 22 are combined with the projective and similarity components determined at step 19, to produce the pair of rectifying transformations corresponding to the most probable set of camera parameters.

The camera parameters being estimated are the intrinsic and extrinsic parameters for the two-camera set up which captured the pair of images, and depend on data gathered from those images. Each camera parameter will have a variation around the measured mean; the variation is unknown, and the present invention enables the variation to be accounted for. Knowing the statistics of the camera parameters makes it possible to choose the most probable combination of the parameters—that is, to choose the combination of parameters which best match the actual cameras used.

As an example, it might be that the camera statistics collected during manufacture of a particular type of stereo camera show that the rotation R is unlikely to have a magnitude of more than 45°. In this case, any rectifying transformations that related to camera parameters involving a rotation R>45° would be unlikely to be chosen.

One possible algorithm for performing the method of FIG. 5 is described in detail below with reference to equations (1) to (27). In this algorithm, step 21 of FIG. 5 is performed by minimising equation (25).

Figure 6:
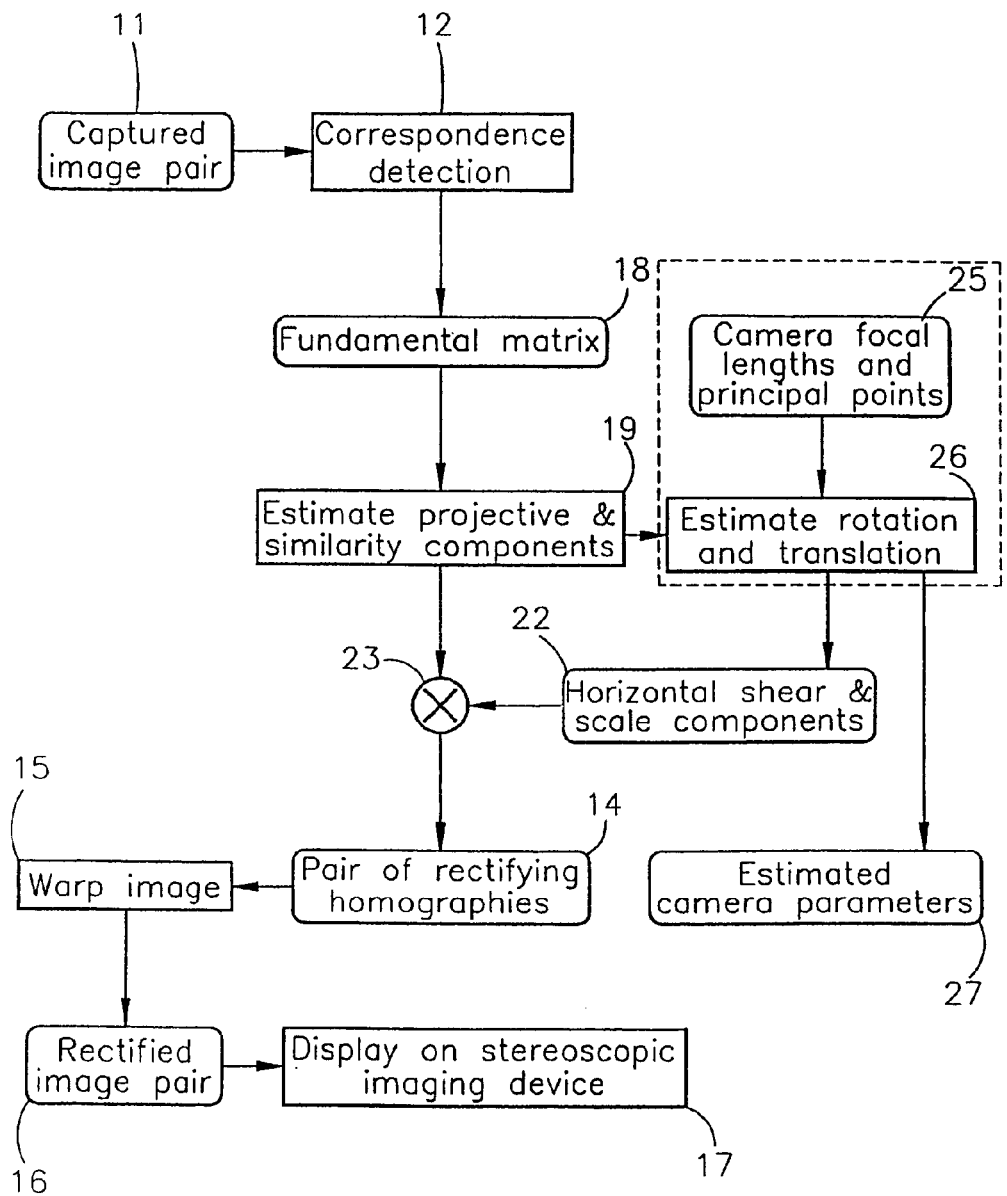
FIG. 6 is a schematic flow diagram of a rectification method incorporating a second embodiment of the present invention.

FIG. 6 shows a second embodiment of the present invention. The method of FIG. 6 corresponds generally to the method of FIG. 5, except that some of the camera parameters are assumed to be known precisely in the method of FIG. 6 and the statistical estimation stage is not required in respect of these camera parameters.

Steps 11, 12, 14–19, 22 and 23 are the same as for the method of FIG. 5, and will not be discussed further.

In this embodiment of the invention it is assumed that the focal length and principal points of the left and right cameras are known, for example from tests made during manufacture, and these are input at step 25. At step 26, the rotation and translation operators R and t are estimated from the focal length and principal points of the cameras, and from the projective and similarity components of the transformations. This is done by decomposing the final matrix to be calculated into several parts, most of which are known. Standard mathematical methods are then used to solve for the unknown quantities.

Once the rotation and translation operators have been estimated, the horizontal shear and scaling components of the rectification transformation are determined from the known focal lengths and principal points of the cameras, and from the estimated rotation and translation operations, at step 22. The pair of rectification transformations are then found by combining the projective and similarity component of the transformations with the horizontal shear and scale components.

If desired, the estimated camera rotation and translation operations can be output at step 27.

This embodiment of the invention is particularly suited for processing a stereo image pair captured using a stereo camera set-up where the intrinsic camera parameters are accurately known, but the extrinsic parameters are not accurately known—that is, where each camera is individually of high quality, and the deviation of the stereoscopic camera set-up from a parallel camera set-up occurs primarily in the orientation of one camera relative to the other.

In the embodiments of the invention described in FIGS. 5 and 6, the choice of the horizontal shear and scaling components of the transformations is constrained to ensure that the resultant pair of rectifying transformations corresponds to a virtual alignment to a parallel camera set-up. To ensure this the shear component is calculated from an equation formulated such that the final matrix is a combination of a rotation and a translation and the internal camera parameters. The rotation and translation ensure that the solution corresponds to a virtual alignment to a parallel camera set-up, in contrast to prior art methods.

Figure 7:
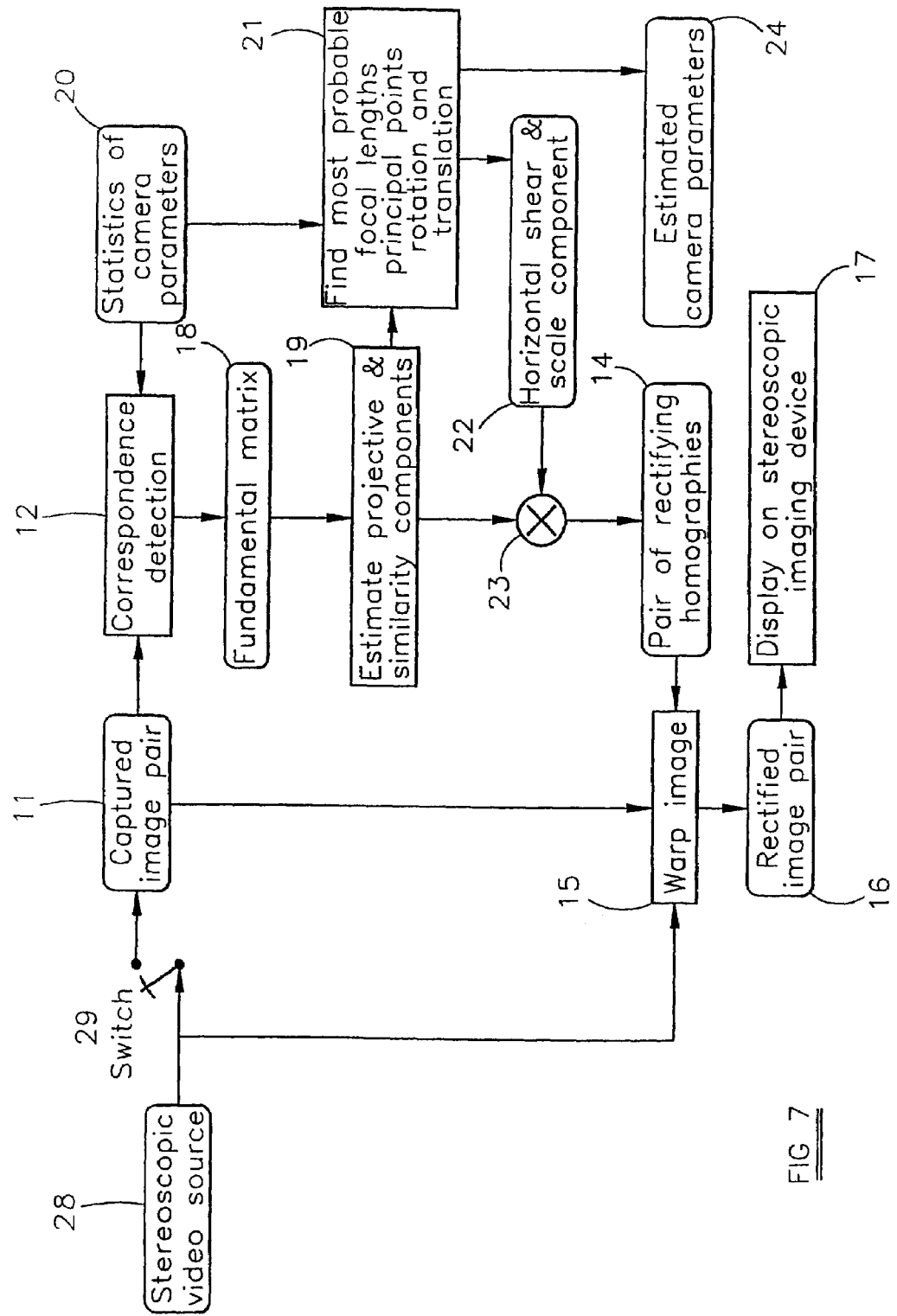
FIG. 7 is a schematic flow diagram of a rectification method incorporating a third embodiment of the present invention.

FIG. 7 shows a further embodiment of the present invention. This embodiment corresponds to the embodiment of FIG. 5, but is intended for use with a stereoscopic video input captured by a stereoscopic video recording system, such as a stereoscopic video camera. In contrast, the method of FIG. 5 is intended for use with a stereoscopic image capture device that produces a pair of "still" stereoscopic images.

In the method of FIG. 7, a stereoscopic video source produces a stereoscopic video picture, which may be considered as a sequence of frames where each frame contains one stereoscopic image pair. The image pair of each frame is rectified to remove vertical disparity, by warping the image at step 15. The step of warping the images at step 15 is carried out in real time, so that the rectified stereoscopic video image is displayed at the same rate as it is produced by the video source. The rectification of each image pair is carried out in the manner described above with reference to FIG. 5.

The method of FIG. 7 can be carried out in essentially three ways. In one approach, the image pair of the first frame captured by the stereoscopic video source is processed in the manner described above with reference to FIG. 5 to determine the rectifying transformations. Once the rectifying transformations have been determined for the image pair of the first frame, they are then used to rectify the image pairs of all subsequent frames without further calculation. That is to say, steps 12 and 18–23 would not be carried out for the image pairs of the second and subsequent frames; instead, the image pairs of the second and subsequent frames would be operated on at step 15 with the pair of rectifying transformations determined for the image pair of the first frame.

A method in which the rectifying transformations are determined for the image pair of the first frame, and are not subsequently recalculated, has the advantage that it reduces the processing power required to display the stereoscopic video image. It does, however, have the potential disadvantage that, if the rectifying transformations determined from the image pair of the first frame should be incorrect, then all subsequent image pairs in the video image will be processed incorrectly.

In another embodiment of the method of FIG. 7, therefore, the rectifying transformations are re-calculated after a number of frames have been processed. In principle the rectifying transformations could be re-calculated be at irregular intervals (that is, after an irregular number of frames had been processed), but in a preferred embodiment the re-calculation is carried out at regular intervals. For example, the rectifying transformations could be re-determined after the image pairs of every N frames have been rectified. That is to say, the image pair of the first frame would be processed as described with reference to FIG. 5 to determine a pair of rectifying transformations, and these rectifying transformations would be used to correct the image pairs of the $1^{st}$ to $N^{th}$ frames. The rectifying transformations would then be re-calculated for the image pair of the $(N+1)^{th}$ frame, and this re-calculated pair of rectifying transformations would be used to rectify the image pairs of the $(N+1)^{th}$ to $(2N)^{th}$ frames, and so on.

In the third embodiment of the method of FIG. 7, the rectifying transformations are re-calculated for the image pair of every frame. The rectifying transformations applied at step 15 would be updated every frame. This provides the most accurate rectification, since an error in determining a pair of rectifying transformations for a frame will affect only that frame, but requires the greatest processing power.

The flow diagram shown in FIG. 7 includes a schematic switch 29, which enables any one of the three embodiments described above to be selected. For the first embodiment, the switch 29 would initially be closed, so that the first stereoscopic image pair recorded by the stereoscopic video source 28 would be subjected to the full rectification processing via steps 11, 12 and 18–23. The switch 29 would then be opened so that the second and subsequent stereoscopic image pairs captured by the video source 28 were passed directly to step 15, where they would be operated on by the rectifying transformations determined from the first image pair.

In the second method described above, the switch 29 is initially closed so that the first stereoscopic image pair recorded by the stereoscopic video source 28 is subjected to the full rectification processing via steps 11, 12 and 18–23. The $1^{st}$ image pair is then processed using the rectifying transformations determined from the $1^{st}$ image pair. The switch 29 is then opened, and the $2^{nd}$ to $N^{th}$ image pairs are processed using the rectifying transformations determined for the lot image pair. The switch is then closed to allow the rectifying transformations to be re-calculated for the $(N+1)^{th}$ image pair, and the $(N+1)^{th}$ image pair is processed using the rectifying transformations determined from the $(N+1)^{th}$ image pair, and the switch is then opened so that the $(N+2)^{th}$ to $(2N)^{th}$ image pairs are processed using the rectifying transformations determined for the $(N+1)^{th}$ image pair, and so on. (If it were desired to re-calculate the rectifying transformations after an irregular number of frames, then the switch would be opened to allow the rectifying transformations to be re-calculated after an irregular number of frames had been processed rather than after every N frames had been processed.)

Finally, in the third method described above, in which the rectifying transformations are re-calculated for every frame, the switch 29 would be kept closed.

Figure 8:
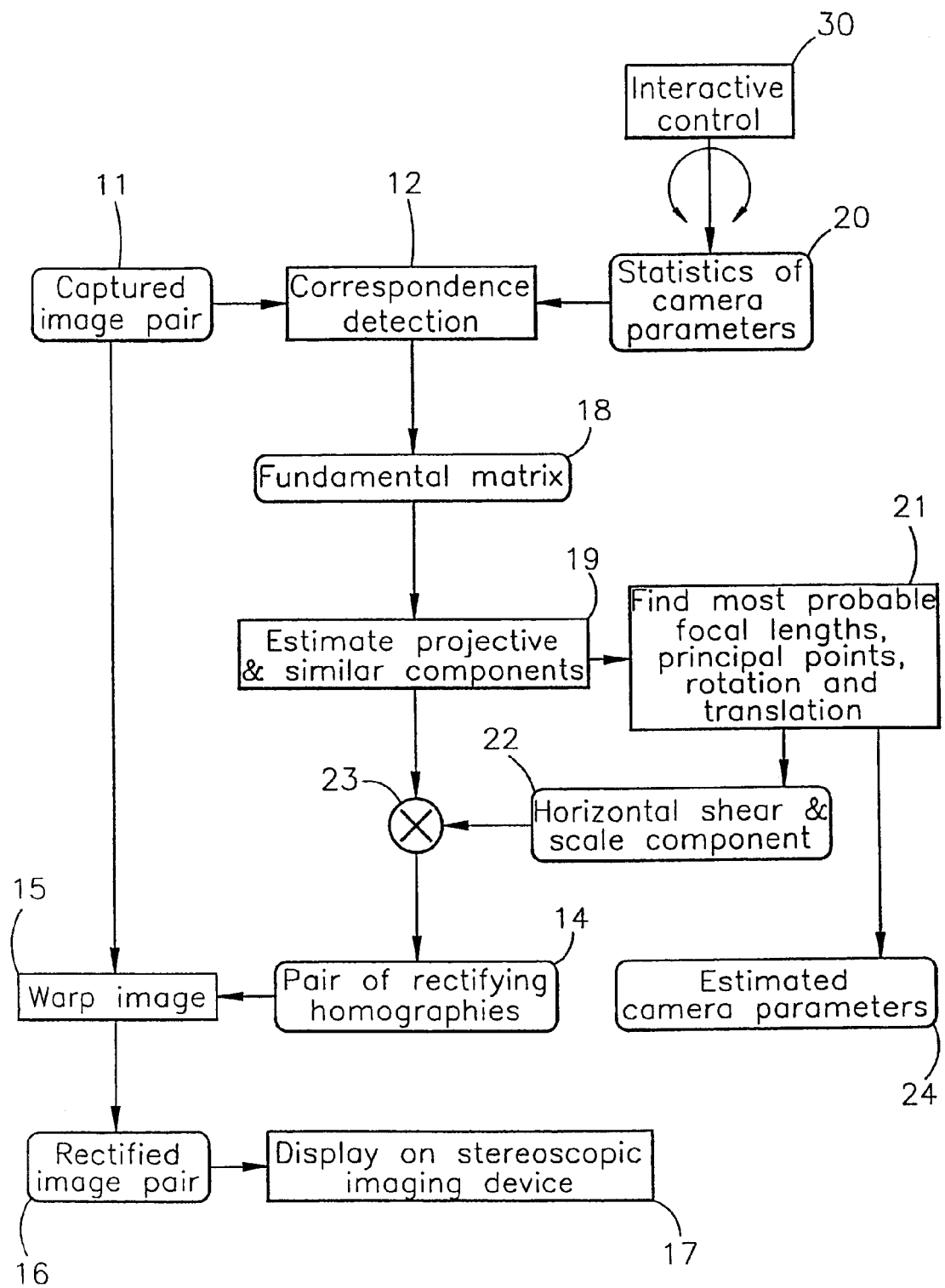
FIG. 8 is a schematic flow diagram of a rectification method incorporating a fourth embodiment of the present invention.

FIG. 8 shows a further embodiment of the present invention. This method is intended for use with a still stereoscopic image recording device.

Steps 11, 12 and 14–24 of the method of FIG. 8 correspond to those of the method of FIG. 5, and will not be described further. The method of FIG. 8 has the added feature, compared to the method of FIG. 5, that a user is provided with interactive control over the statistics of the camera parameters that are used in the determination of the rectifying transformations. In the method of FIG. 8, a user is able to select or modify, at step 30, the statistics of the camera parameters.

The interactive control over the camera parameters allows the user to superimpose their knowledge about one or more camera parameters on the statistics of the camera parameters used at step 20. The user control over the camera parameters can be implemented by, for example, changing the variance of one or more camera parameters from the initial input variance of the parameters. For example, a user who has a strong belief that the relative rotation between the optical axes of the two cameras of the stereoscopic camera set up is small would be able to decrease the variance relating to the rotation, to further reduce the possibility that the selected rectifying transformations will correspond to a large rotation.

In a modified version of the embodiment of FIG. 8, it is possible for an appropriately sub-sampled portion of the rectified image to be displayed in real-time. For example, sub-sampled portions of the left and right images could be rectified using an initial pair of rectification transformations and the results displayed. If the displayed results indicated that the initial rectification transformations were satisfactory at eliminating vertical disparity, the initial rectification transformations could be adopted. However, if the displayed results indicated that the initial rectification transformations did not satisfactorily eliminate vertical disparity, the user could vary one or more of the camera parameters thereby to alter the rectification transformations, the new rectification transformations could be used to rectify the sub-sampled portion, and the new results displayed; these steps could be repeated until satisfactory rectifying transformations were obtained. This embodiment allows user to monitor the effect of adjusting the camera parameters and obtain feedback to what the final image might look like. The maximum size of the sub-sampled image that can be displayed this way will depend on the available processing power.

Figure 9:
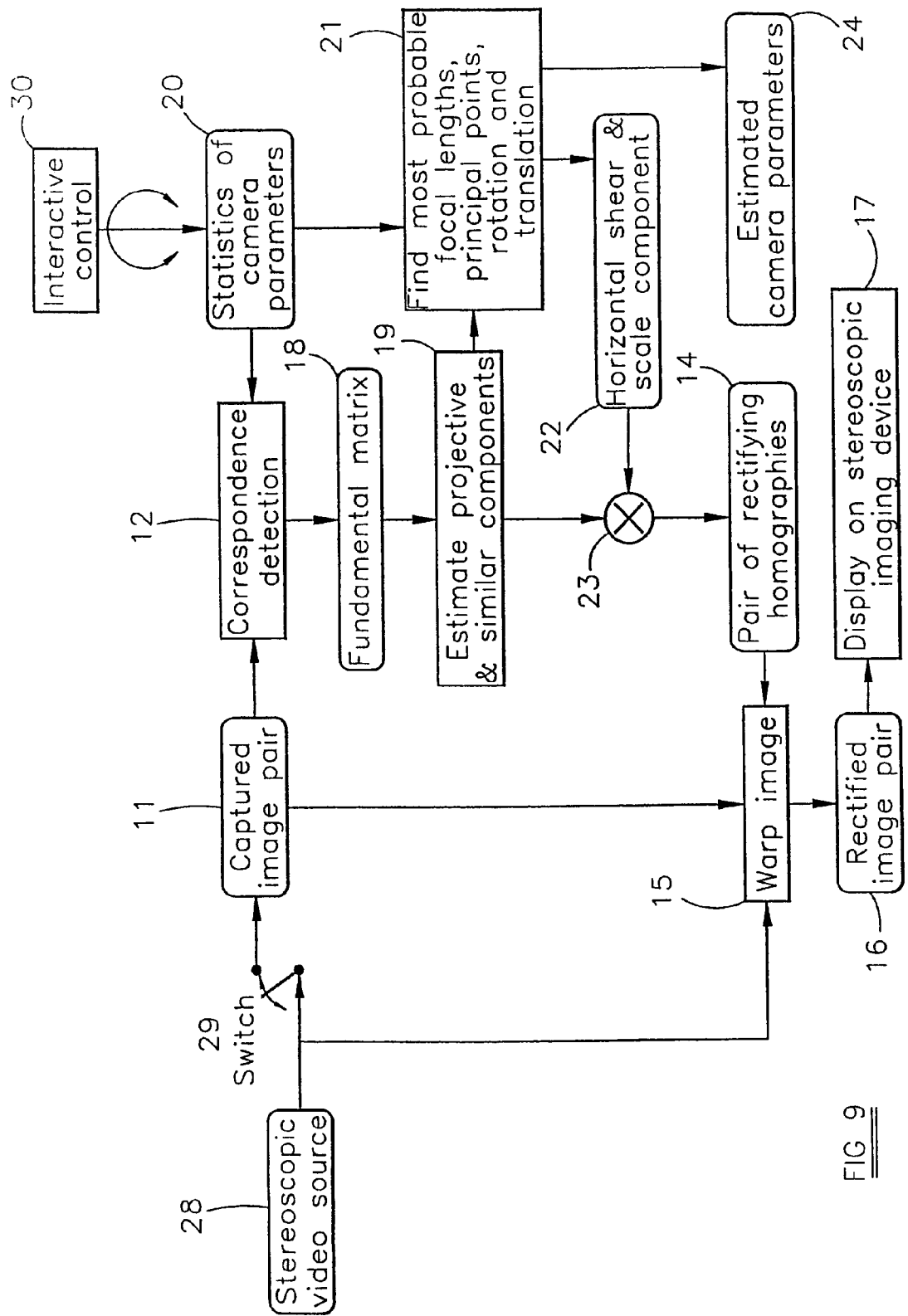
FIG. 9 is a schematic flow diagram of a rectification process incorporating a fifth embodiment of the present invention.

FIG. 9 illustrates a further embodiment of the invention. The embodiment of FIG. 9 corresponds generally to that of FIG. 8 in that it provides interactive control over the camera parameters, but it is for use with a stereoscopic video source rather than a still stereoscopic image source. The steps of the embodiment of FIG. 9 correspond generally to steps in the embodiments of FIG. 7 or FIG. 8, and so will not be described in detail.

A further embodiment of the present invention (not illustrated) corresponds generally to the embodiment of FIG. 6, but is adapted for use with a stereoscopic video source rather than a still stereoscopic camera.

An algorithm suitable for performing the method shown in FIG. 5 will now be described in detail.

Figure 1:
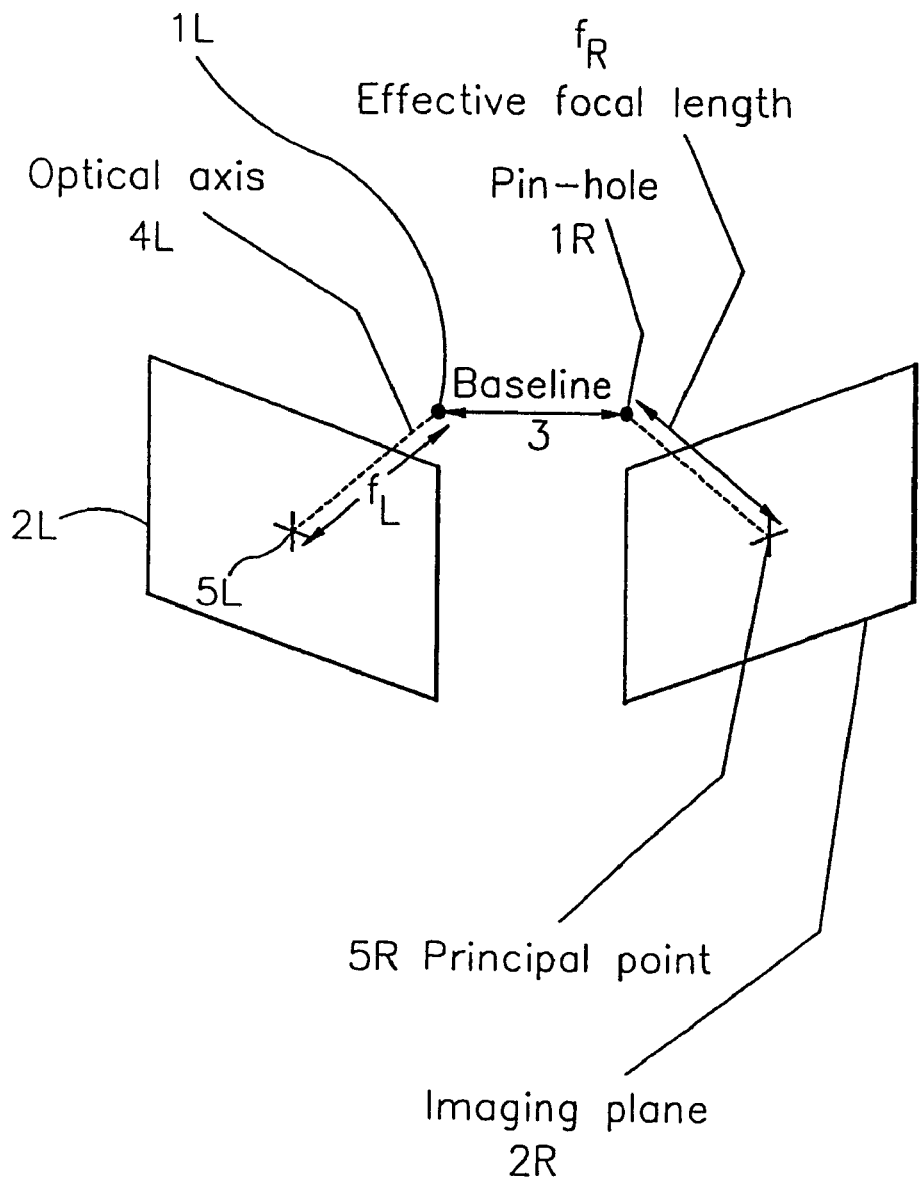
FIG. 1 is a schematic perspective view of an image capture device for recording a stereoscopic image pair.
Figure 2A:
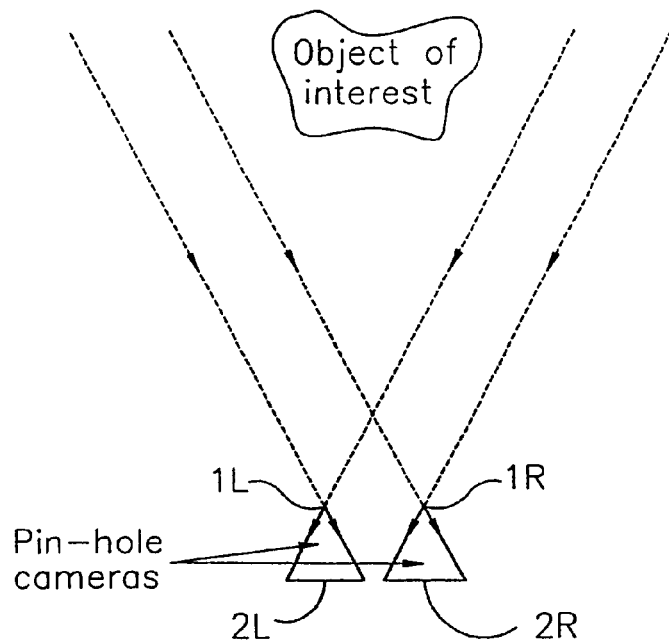
FIG. 2(a) is a plan view of the image capture device of FIG. 1.
Figure 2B:
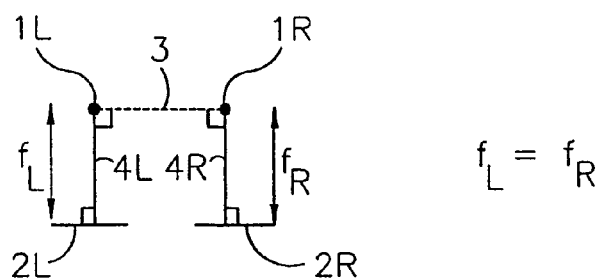
FIG. 2(b) is a schematic illustration of a parallel camera set up for recording a stereoscopic image pair.
Figure 2C:
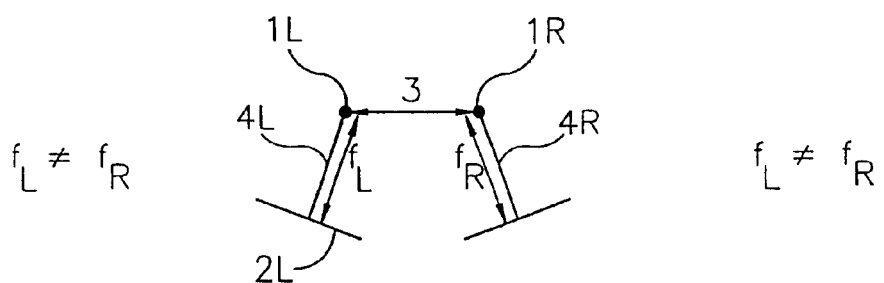
FIG. 2(c) is a schematic illustration of a non-parallel camera set up for recording a stereoscopic image pair.
Figure 3A:
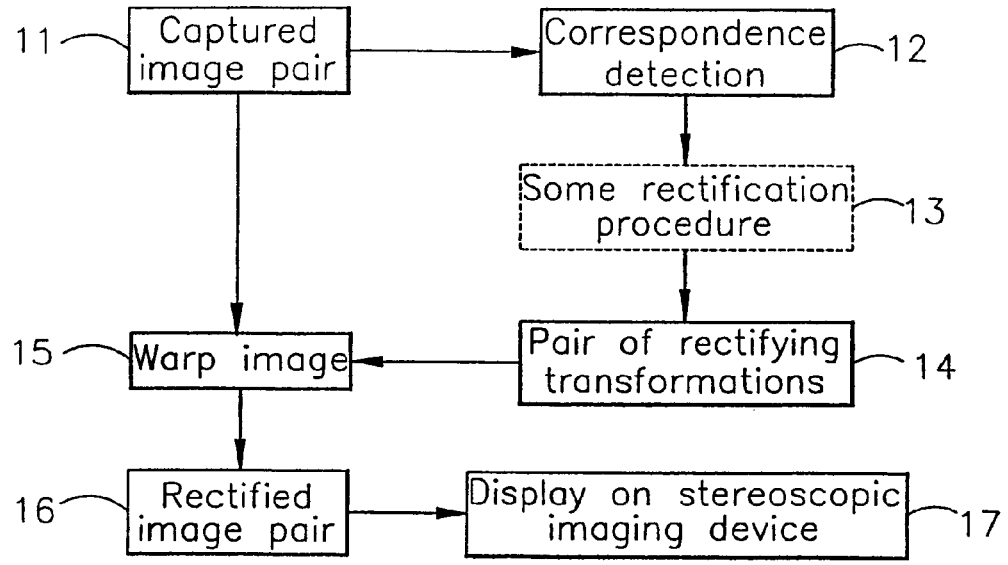
FIG. 3(a) is a block flow diagram of a prior art rectification process.
Figure 3B:
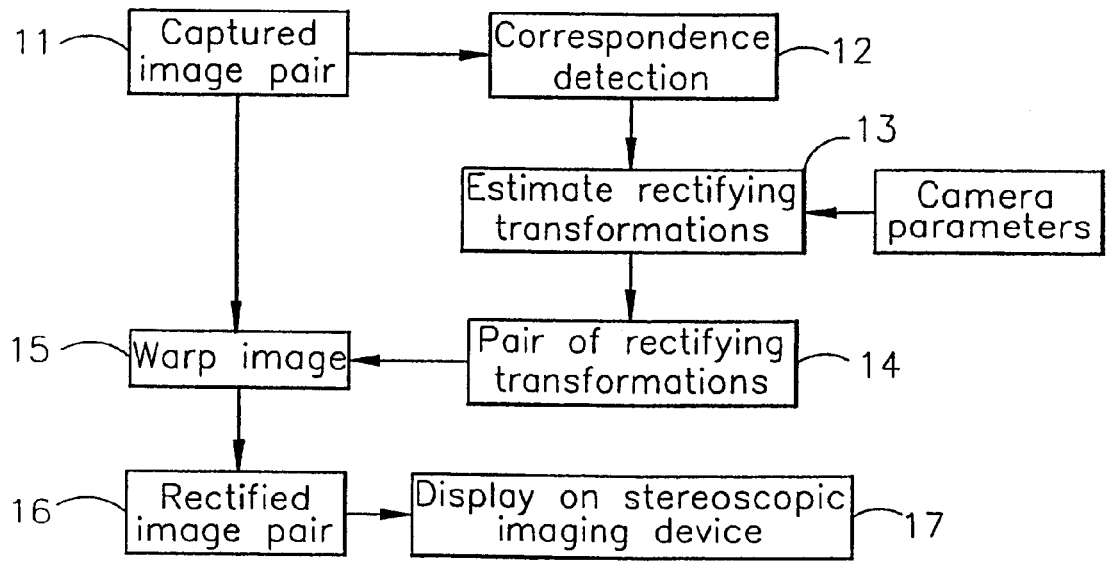
FIG. 3(b) is a schematic block view of a further prior art rectification process.
Figure 3C:
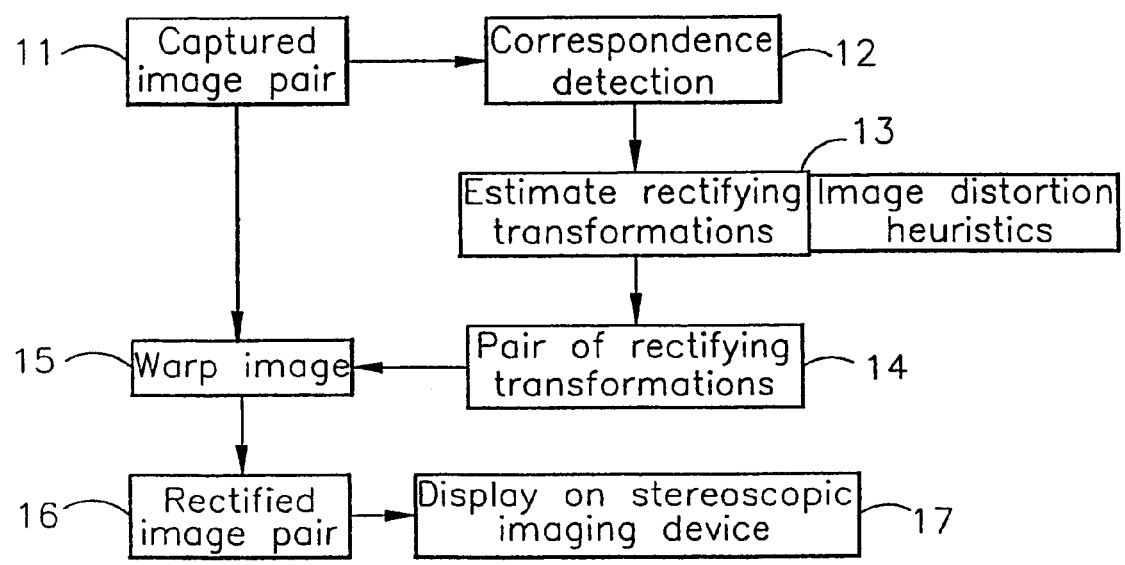
FIG. 3(c) is a schematic block diagram of a further prior art rectification process.

The camera model is the set-up of two pin-hole cameras shown in FIG. 3(a). It is assumed that lens distortions are negligible or are accounted for by pre-processing the images. The origin of the world coordinates is chosen to be the pin-hole of the first camera. The origin of the image co-ordinates is the centre of the image. Vectors and matrices are projective quantities, unless stated otherwise. Equality of projective quantities denotes equality up to scale.

A 3×4 (3 row×4 column) camera matrix $P_i$ takes a three-dimensional point X and projects it to a two-dimensional image point $x_i$ i.e. $x_i = P_i X$. X is a 3-dimensional point, but its matrix representation has a $4^{th}$ co-ordinate as typically used in matrix transformations, especially perspective transforms. The matrix representation of $x_i$ has three co-ordinates, and $x_i$ can be thought of as a scaled two-dimensional co-ordinate with the 3rd co-ordinate equal to 1-a typical perspective transform result.

The camera matrices are given by $$P_0 = K_0[I|0] \quad P_1 = K_1[R^T|-R^T t] \tag{1}$$

where $K_i$ is the 3×3 calibration matrix of the ith camera (1=0 for the left camera and i=1 for the right camera), R is a 3×3 rotation matrix and t is a translation 3-vector. R and t are respectively the rotation and translation of the right camera (i=1) relative to the left camera (i=0) in FIG. 3(a). Assuming that skew is negligible, the calibration matrix $K_i$ is $$K_i = \begin{bmatrix} f_i & 0 & p_i \\ 0 & f_i & q_i \\ 0 & 0 & 0 \end{bmatrix}$$

where $f_i$ is the effective focal length and $(p_i, q_i)$ is the principal point in the image plane.

The 3×3 fundamental matrix F relates to the projective and similarity components of the rectifying transformation, as indicated by step 18 of FIGS. 5 to 9. The fundamental matrix F relates to a point $x_{oj}$ in the left image of an image pair to the corresponding point $x_{ij}$ in the right image of the image pair.

$$x_i^T F x_{oj} = 0 \tag{3}$$

for all j. The fundamental matrix encapsulates the epipolar geometry of a two-camera setup, and is given by $$F = K_1^T [t] x R K_0^{-1} \tag{4}$$

where [t]x denotes the anti-symmetric matrix $$\begin{bmatrix} 0 & -t_z & t_y \\ t_z & 0 & -t_x \\ -t_y & t_x & 0 \end{bmatrix} \tag{5}$$

The epipolar geometry of two cameras is illustrated in FIG. 4(b). As noted above, the right image point corresponding to left image point $x_0$ must lie on the epipolar line, and this is expressed algebraically by Eq. 3.

It is required to find a pair of rectifying homographies $(H_o, H_i)$ such that the transformed corresponding image points $\{\tilde{x}_{oj} \leftrightarrow \tilde{x}_{1j}\}$, which are given by $$\tilde{x}_{oj} = H_o x_{oj} \text{ and } \tilde{x}_{ij} = H_1 x_{1j} \quad (6)$$

satisfy $$x_{1j}^{-T} \begin{bmatrix} 0 & 0 & 0 \\ 0 & 0 & -1 \\ 0 & 1 & 0 \end{bmatrix} \overline{x}_{0j} = 0. \quad (7)$$

Note that Eq. 7 is an epipolar constraint with a fundamental matrix which corresponds to identical cameras with only a translation between the cameras. Matching epipolar lines in the transformed images will be horizontal and have the same y offset. The constraint on the rectifying homographies is thus $$F = H_1^T [i] \times H_0, \quad (8)$$

where $=i=[1, 0, 0]^T$

Step 12 in the methods of FIGS. 5 to 9, labelled "correspondence detection", establishes pairs of image points (one point in the left image and one point in the right image) which are images of a unique three-dimensional point in the object scene. The inputs to step 12 are an image pair and optionally the statistics of the camera parameters. The output is a fundamental matrix.

The correspondence of the point features is established using known robust statistical methods like RANSAC as disclosed by, for example, M. Fischler et al in "Random sample consensus: A paradigm for model fitting with applications to image analysis and automated cartography" in "Communications of the ACM" Vol 24, No. 6, pp381–395 (1981) or by P. Torr et al in "Outlier detection and motion segmentation" in "SPIE Sensor Fusion VI" Vol 2059 pp 432–443 (1993), or Least Median Square as disclosed by R. Deriche et al in "Robust recovery of the epipolar geometry for an uncalibrated stereo rig" in "European Conference on Computer Vision" pp567–576 (1994). Robust methods will reject chance correspondences which do not fit into the epipolar geometry governed by the majority of the correspondences.

In the search of correspondences, the statistics of the camera parameters are used to restrict the search. In the case where the camera parameters are known exactly, the exact fundamental matrix F is given by Eq. 4. A point feature $x_{oj}$ in the left image (image 0) must correspond to a point feature $x_{ij}$ in the right image,(image 1) which lies on the epipolar line $$x_{1j}^T F x_{oj} = 0.$$

When the camera parameters are not known exactly, instead of just searching along the epipolar line, the correspondence search is widened to a region around the epipolar line. The better accuracy the camera calibration is known, the more restricted is the correspondence search.

Box 20 in FIGS. 5 to 9, labelled "statistics of camera parameters", consists of results of some calibration procedure which establishes the variations of the intrinsic and extrinsic camera parameters. For example, the mean and variance of the parameters may be determined. A typical calibration procedure involves recording different views of a known calibration object. Examples of known methods are disclosed by R. Tsai in "An efficient and accurate camera calibration technique for 3D machine vision" in "Conference on Computer Vision and Pattern Recognition" pp364–374 (1986) and by Z Zhang in "Flexible camera calibration by viewing a plane from unknown orientations" in "International Conference on Computer Vision" (1999). Both of these methods account for lens distortions. There are also calibration methods known as "self-calibration" which do not use a calibration object and depend on features in a scene. Examples are disclosed by R. Hartley in "Self-Calibration from multiple views with a rotating camera" in "European Conference on Computer Vision" pp 471–478, Springer-Verlag (1994) and by A. Zisserman et al in "Metric calibration of a stereo rig" IEEE Workshop on Representation of Visual Scenes, Boston, pp93–100 (1995).

Loop et al (supra) have provided a useful decomposition and relationship of the rectifying homographies $H_0$ and $H_1$. A projective matrix $$H = \begin{bmatrix} u_a & u_b & u_c \\ v_a & v_b & v_c \\ w_a & w_b & 1 \end{bmatrix} \quad (9)$$

can be decomposed into $H = H_s H_r H_p$ where $$Hr = \begin{bmatrix} v_b - v_c w_b & v_c w_a - v_a & 0 \\ v_a - v_c w_a & v_b - v_c w_b & v_c \\ 0 & 0 & 0 \end{bmatrix}, H_p = \begin{bmatrix} 1 & 0 & 0 \\ 0 & 1 & 0 \\ w_a & w_b & 1 \end{bmatrix} \quad (10)$$

and $H_s = H H_p^{-1} H_r^{-1}$ is of the following form $$H_s = \begin{bmatrix} s_a & s_b & s_c \\ 0 & 1 & 0 \\ 0 & 0 & 1 \end{bmatrix}. \quad (11)$$

The matrix $H_p$ contains only projective terms. The matrix $H_r$ is a similarity transformation, with the upper-left 2×2 sub-matrix being an orthogonal matrix (scale+rotation). The matrix $H_a$ is a horizontal scale and shear transform. For brevity, we will call $H_s$ the shear component.

Let the rectifying homography $H_i$ for camera i be decomposed into $H_{is}$, $H_{ir}$, and $H_{ip}$. Since $H_0$ and $H_1$ are rectifying homographies satisfying Eq. 8, there are certain relationships between the decomposed matrices, as discussed below.

Step 19 of the method of FIGS. 5 to 9, labelled "estimate projective and similarity component", will now be considered.

Let $e_i$ and $\tilde{e}_i$ denote the epipoles of the original and rectified image pair respectively the epipoles $e_i$ are readily calculated from the fundamental matrix F. For a pair of rectified images, the epipoles $\tilde{e}_i$ are at infinity and lie on the x-axis. i.e. $\tilde{e}_i = [1, 0, 0]_T$. Since only the projective terms in $H_{ip}$ can map finite points to infinity, information about the projective terms are contained in the epipoles. The following describes a procedure to determine the projective terms from the epipoles.

The similarity and projective components for image 0 is determined by first rotating the epipole $e_0$ onto the x-axis and then mapping it to infinity by the projective components. There are two rotations which map an epipole onto the x-axis (that is, onto the positive and negative side of the x-axis). The rotation with the smallest angle is chosen, and is denoted by $$H_{0r} = \begin{bmatrix} c_{0z} & s_{0z} & 0 \\ -s_{0z} & c_{0z} & 0 \\ 0 & 0 & 1 \end{bmatrix} \qquad (12)$$

Let the rotated epipole be $e'_0 = H_{0x}s_0$. We set the projective component in the rotated co-ordinate frame as $$H'_{0p} = \begin{bmatrix} 1 & 0 & 0 \\ 0 & 1 & 0 \\ \tilde{w}_{0a} & \tilde{w}_{0b} & 1 \end{bmatrix} = \begin{bmatrix} 1 & 0 & 0 \\ 0 & 1 & 0 \\ -1/e'_0(0) & 0 & 1 \end{bmatrix} \qquad (13)$$

where e(i) denotes the ith component of the vector e.

$H'_{0p}$ will map the rotated epipole $e'_0$ to infinity. It is assumed for the moment that $\tilde{w}_{0b} = 0$.

The projective component in the original co-ordinate frame is thus $$H_{0p} = \begin{bmatrix} 1 & 0 & 0 \\ 0 & 1 & 0 \\ w_{0a} & w_{0b} & 1 \end{bmatrix} = H_{0r}^T H'_{0p}. \qquad (14)$$

i.e. $w_{0a} = c_{0z}\tilde{w}_{0a} - s_{0z}\tilde{w}_{0b}$ and $w_{0b} = s_{0z}\tilde{w}_{0a} + c_{0z}\tilde{w}_{0b}$.

The problem now is: given $(H_{0r}, H_{0p})$ and the fundamental matrix F, to find the matching rectifying homographies $(H_{1r}, H_{1p})$. The rectification constraint on the homographies is given in Eq. 8. Since $$H_{1s}^T[i] \times H_{0s} = [i]x,$$

the shear components $H_{is}$ do not affect the rectification. Eq. 8 only constrains the similarity and projective components i.e.

$$F = H_{1p}^T H_{1r}^T [i] \times H_{0r} H_{op}. \qquad (15)$$

Given $(H_{or}, H_{op})$, it is possible to solve for $(H_{1r}, H_{1p})$ using Eq. 15. In particular, if $$H_{ir} = \begin{bmatrix} c_{iz} & s_{iz} & 0 \\ -s_{iz} & c_{iz} & 0 \\ 0 & 0 & 1 \end{bmatrix} \text{ and } H_{ip} = \begin{bmatrix} 1 & 0 & 0 \\ 0 & 1 & 0 \\ w_{ia} & w_{ib} & 1 \end{bmatrix} \qquad (16)$$

then $$H_1^T H_{1r}^T[i] = \qquad (17)$$

$$FH_{0p}^{-1}H_{0r}^{-1} \begin{bmatrix} 0 & w_{1a} & s_{1z} - w_{1a}y_1 \\ 0 & w_{1b} & -c_{1z} - w_{1b}y_1 \\ 0 & 1 & -y_1 \end{bmatrix} = \begin{bmatrix} \vdots & -s_{0z}F(0,0) + c_{0z}F(0,1) - F(0,2)\tilde{w}_{ob}F(0,2) \\ \vdots & -s_{0z}F(1,0) + c_{0z}F(1,1) - F(1,2)\tilde{w}_{ob}F(1,2) \\ \vdots & -s_{0z}F(2,0) + c_{0z}F(2,1) - F(2,2)\tilde{w}_{ob}F(2,2) \end{bmatrix}$$

where $\tilde{w}_{ob} = -s_{0z}w_{0a}c_{0z}w_{0b}$. Solving the above equations and noting that equality is up to scale, yields the following solution.

$$H_{1r} = \begin{bmatrix} c_{iz} & s_{1z} & 0 \\ -s_{1z} & c_{1z} & y_1 \\ 0 & 0 & 1 \end{bmatrix}, H_{1p} = \begin{bmatrix} 1 & 0 & 0 \\ 0 & 1 & 0 \\ w_{1a} & w_{1b} & 1 \end{bmatrix} \qquad (18)$$

where $y_1 = -F(2,2)/w_{1c}$ $w_{1a} = [c_{0z}F(0,1) - s_{0z}F(0,0) - F(0,2)\tilde{w}_{ob}]/w_{1c}$ $w_{1b} = [c_{0z}F(1,1) - s_{0z}F(1,0) - F(1,2)\tilde{w}_{ob}]/w_{1c}$ $w_{1c} = c_{0z}F(2,1) - s_{0z}F(2,0) - F(2,2)\tilde{w}_{ob}$ $s_{1z} = F(0,2)/w_{1c} + w_{1a}y_1$ $c_{1z} = -(F(1,2)/w_{1c} + w_{1b}y_1) \qquad (19)$ M (i, j) denotes the (i, j)th element of the matrix M. It can be verified that the rotation matrices in $H_{or}$ and $H_{1r}$ correspond to the rotation of the epipoles $e_0$ and $e_1$ onto the x-axis. Note that $$c_{0z}^2 + s_{0z}^2 = 1,$$

but $$c_{1z}^2 + s_{1z}^2$$

is not necessarily unity, there is a scale factor in the similarity transform $H_{1r}$.

In the above procedure, the projective term $\tilde{w}_{0b}$ of image 0 was arbitrarily set to zero in Sq. 13. This leads to a certain value for the projective term $\tilde{w}_{1b}$ in the right image (image 1). In fact there is a one-parameter family of choices for the pair ($\tilde{w}_{0b}$, $\tilde{w}_{1b}$), each of which leads to a pair of homographies that satisfy the rectification constraint in Eq. 8. The freedom in the choice of the projective term $\tilde{w}_{0b}$ is related to the freedom in the choice of the rotation about the baseline of a pair of parallel cameras. All rotations about the baseline of a pair of parallel cameras will give a pair of rectified images.

To minimise the amount of image distortion, one can choose $\tilde{w}_{0b}$ such that $\tilde{w}_{0b} = -\tilde{w}_{1b}$. R. Hartley (1998) (supra) and Loop et al (supra) used image distortion criteria that are different from the one disclosed here. Noting that $\tilde{w}_{ib}$ denotes the y-component projective term in the co-ordinate frame rotated by $H_{ir}$ (i.e. $\tilde{w}_{ib} = -s_{iz}w_{ia} + c_{iz}w_{ib}$), it is necessary to solve:

$$\tilde{w}_{1b} = -\tilde{w}_{0b} = -s_{1z}w_{1a} + c_{1z}w_{1b} \quad (20)$$

With $w_{1a}$ and $w_{1b}$ given by Eq. 19 in terms of $\tilde{w}_{0b}$, this leads to a quadratic equation $\alpha \tilde{w}_{1b}^2 = \beta \tilde{w}_{1b} \gamma = 0$ with $\alpha = F(2,2)$ $\beta = -s_{0z}F(2,0) + c_{0z}F(2,1) + s_{1z}F(0,2) - c_{1z}F(1,2)$ $\tau = s_{1z}[-s_{0z}F(0,0) + c_{0z}F(0,1)] - c_{1z}[-s_{0z}F(1,0) + c_{0z}F(1,1)]$ \quad (21)

This may be solved using the standard formula for the roots of aquadratic equation; the solution with the smaller magnitude is chosen.

FIG. 6 illustrates a method in which the camera calibration is known. Step 26 of FIG. 6, labelled "estimate rotation & translation" in FIG. 6, will now be considered.

Since Eq. 7 does not impose any constraints on the shear component, we have complete freedom in choosing the 6 (3 per image) horizontal shear/scale parameters. These terms are typically chosen by minimising some image distortion criterion. The criterion used by R. Hartley (1998) (supra) relates to disparity ranges in the rectified images. The criterion used in by Loop et al (supra) relates to the aspect ratio and perpendicularity of two lines formed by the midpoints of the image boundary. The output of the rectification in these prior methods is used for disparity estimation.

The criteria used to determine the shear component in these prior art methods can lead to rectification transformations that do not correspond to a virtual alignment to a parallel camera set-up. This is because these prior art methods do not relate to the display of a stereoscopic image. As long as the shear terms do not result in a significant distortion, a disparity estimator will be able to correlate features between the images. For the purpose of viewing the rectified image pair on a stereoscopic display, however, there is a more stringent requirement.

According to the method of FIG. 6, the criterion for the determination of the shear component relates to what is physically probable. The shear component is chosen such that the rectifying homography corresponds to virtually rotating the camera. Furthermore, the shear terms are constrained using a priori knowledge of the intrinsic and extrinsic parameters of the camera. This a priori knowledge is expressed in terms of probability densities. All parameters are assumed to follow a Gaussian (or truncated Gaussian) distribution with a certain mean and variance.

Assume for the moment that the calibration matrices $K_i$ are known. For some rotation matrix $R_i$, $K_i R_i K_i^{-1}$ is the holography which virtually rotates camera i by $R_i$. For a pair of rectifying homographsies, $R_o$ and $R_1$ are functions of the camera rotation R and translation t. The shear component $H_{is}$ must satisfy $$H_{it} H_{is} H_{ir} H_{ip} = R_i K_i^{-1} \quad (22)$$

for some scale and translation transform $H_{it}$ of the form $$H_{it} = \begin{bmatrix} \sigma & 0 & \lambda \\ 0 & \sigma & \mu \\ 0 & 0 & 1 \end{bmatrix} \quad (23)$$

Given ($H_{ir}$, $H_{ip}$, $K_i$), an upper triangular matrix $U_i = H_{it} H_{is}$ is required such that Eq. 22 is satisfied. Because $R_i$ is an orthonormal matrix, we have $$U_i H_{ir} H_{ip} K_i = (U_i H_{or} H_{ip} K_i)^{-T} \quad (24)$$

$$U_i^T U_i = H_{ir}^{-T} H_{ip}^{-T} K_i^{-T} K_i^{-1} H_{ip}^{-1} H_{ir}^{-1}$$

Cholesky decomposition of the right hand side of Eqn. 24 gives $U_i$, and hence the shear component $H_{is}$. This also gives the rotations $R_0$ and $R_1$, from which the camera rotation R and translation t can be calculated.

The convention thus provides a procedure for estimating R and t from known calibration matrices K and the projective and similarity components. Since only the horizontal shear and scale components is affected by the calibration matrices $K_i$ inaccuracies in the calibration matrices will only lead to an incorrect horizontal shear and scale in the final rectifying homography. Zero vertical disparity is maintained in spite of inaccurate camera calibrations. This is illustrated in FIG. 6, where errors in the "camera focal lengths & principal points" box, box 25, are only propagated to the "horizontal shear & scale component" box. The methods of Ayache et al, Kang et al and Fusiello et al do not have this error-tolerant property.

Step 21 of the method of FIGS. 5 to 9, labelled "find most probable focal lengths, principal points, rotation & translation" will now be considered. In the method of FIG. 6, the calibration matrices are assumed to be known. The matrices will in fact not be known exactly. The parameters are only known up to a certain accuracy that is specified by the mean and variance of a Gaussian distribute on. In the method of FIG. 5, the procedure in the dashed-box in FIG. 6 is modified to account for this.

Let the mean and standard deviation of a parameter x by denoted by $\mu_x$ and $\sigma_x$ respectively. We seek the parameters ($K_0$, $K_1$, R, t) which minimise a weighted sum of the squares of errors from the mean, i.e.

$$\underset{K_0,K_1,R,t}{\operatorname{argmin}} \left[ \sum_{i=0}^{1} \frac{(\mu_{fi} - f_i)^2}{\sigma_{fi}^2} + \frac{(\mu_{pi} - p_i)^2}{\sigma_{pi}^2} + \frac{(\mu_{qi} - q_i)^2}{\sigma_{qi}^2} + \sum_{j=1}^{5} \frac{\theta_j(R,t)}{\sigma_{\theta j}^2} \right] \quad (25)$$

The solution to Eq. 25 is the most probable set of parameters. The five functions $\theta_j$ (R, t) are simply functions to extract the angles of rotations from the rotation matrix r and translation vector t. There are 5 angles because there are 3 angles for R, and 2 angles for the direction of the translation t.

For simplicity, functions that account for truncation in Eq. 25 i.e. focal length must be positive, principal point must be within image and angles must be within ±180° have been omitted. These constraints are implemented in practice.

In the embodiments of FIGS. 8 and 9 a user is able to vary one or more of the quantities in Eqn. 25, so that the user has control over the camera parameters.

The non-linear objective function in Eq. 25 can be minimised by any suitable mathematical technique. One suitable technique for minimising Eq 25 is the Levenberg-Marquardt method. The initial input to the iterative Levenberg-Marquardt algorithm is the camera rotation R and translation t estimated using the mean calibration matrices with the procedure in the previous section.

The rectifying homographies are given by $H_i = H_{is}H_{ir}H_{ip}$. The final step applies (i) a scale to both homographies $H_0$ and $H_1$ such that the area of the image is roughly preserved after rectification, and (ii) a translation to both homographies $H_0$ and $H_1$ such that the rectified image is roughly central. Let $A_i$ and $\tilde{A}_i$ be the areas of the original image i and the rectified image i respectively. The mean scale $$\tau = \frac{2}{\sqrt{A_0/\tilde{A}_0} + \sqrt{A_1/\tilde{A}_1}} \quad (26)$$

is used to roughly preserve the areas of both rectified images. Instead of the arithmetic mean, the geometric mean can alternatively be used. The central point in image i is mapped to $[H_i(0,2), H_i(1,2),1]^T$. Preferably a translation such that the central point is mapped to the mean of the two rectified central image point is used. The scale and translation matrix applied to both $H_i$ is:

$$\begin{bmatrix} \tau & 0 & -\tau[H_0(0,2) + H_1(0,2)]/2 \\ 0 & \tau & -\tau[H_0(1,2) + H_1(1,2)]/2 \\ 0 & 0 & 1 \end{bmatrix} \quad (27)$$

The principal features of an algorithm suitable for id implementing the method of FIG. 5 may be summarised as follows.

1. Calculate the epipoles $\theta_0$ and $\theta_1$ from the estimated F.
2. Rotate the first image such that the epipolar $\theta_0$ lies on the x-axis. Find the projective terms such that the rotated epipole $\tilde{e}_0$ is mapped to infinity $[1, 0, 0]^T$.
3. From the similarity and projective components for the first image, find the corresponding similarity and projective homographies for the second image according to Eqns. 18 and 19.
4. Re-choose the projective terms $w_{0b}$ and $w_{1b}$ to minimise image distortion.
5. Choose the shear terms according to Eqn 25 which is based on a priori knowledge of the camera parameters.
6. Form the resultant rectifying homographies with $H_i = H_{is}H_{ir}H_{ip}$, where $H_{is}$, $H_{ir}$ and $H_{ip}$ are the shear, similarity and projective components respectively.
7. Apply a scale to both homographies $H_0$ and $H_1$ such that the area of the image is roughly preserved. Apply a translation to both homographies $H_0$ and $H_1$ such that the rectified image is roughly central.

Algorithms for other embodiments of the invention may be obtained by making appropriate modifications to the above-described routine.

In the methods described in the application, the two components of the rectification transformations are determined, and these are then combined. The images are then rectified by warping the images using the combined transformations. In principle it would be possible for the step of combining the two components of the transformations to be eliminated, and for the warping step to have two stages (namely, a first warping step using the first component of the rectification transformations followed by a second warping step using the second component).

Figure 11:
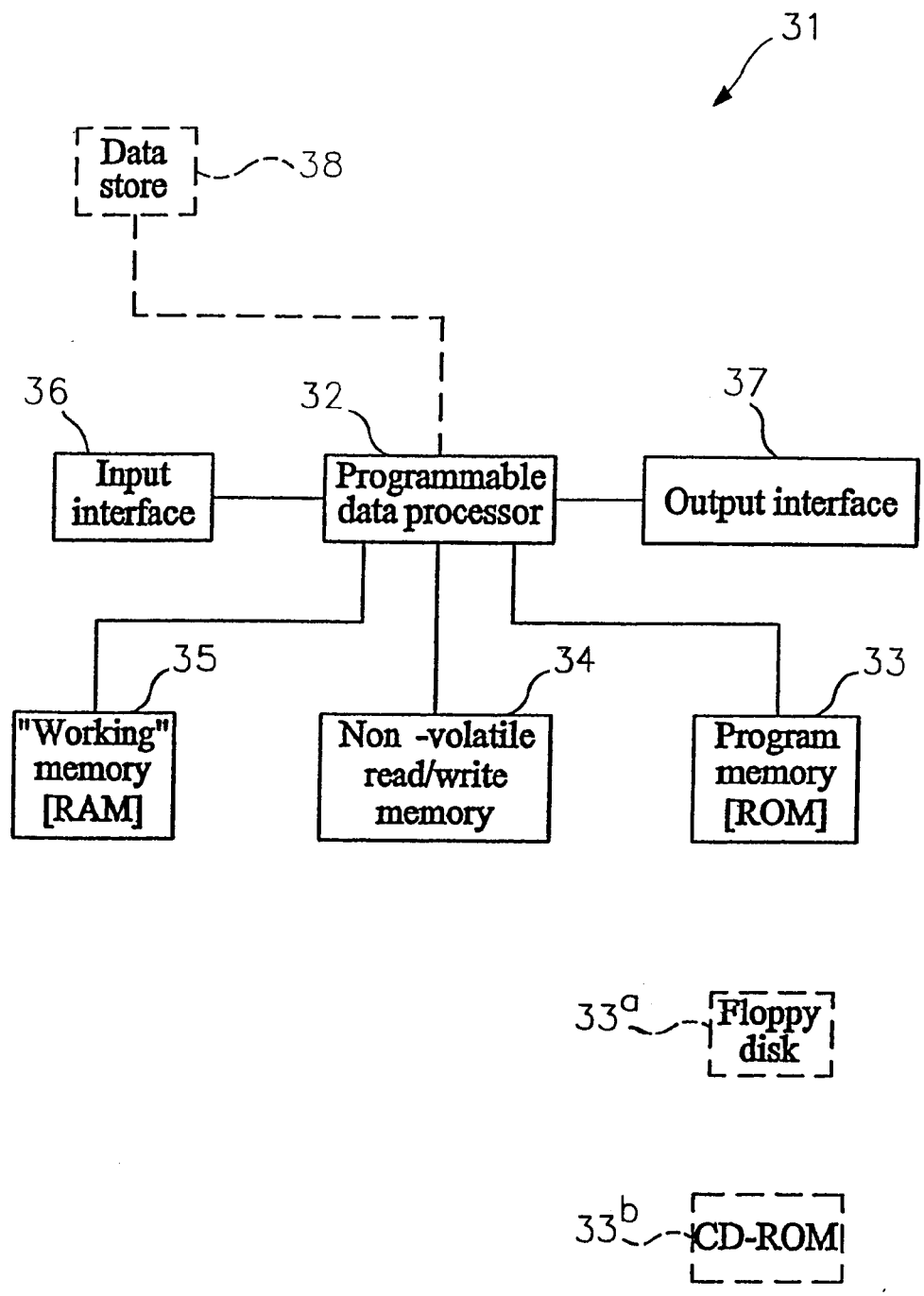
FIG. 11 is a block schematic illustration of an apparatus according to an embodiment of the invention.

FIG. 11 is a schematic block diagram of an apparatus 31 that is able to perform a method according to the present invention. The apparatus is able to a stereoscopic image pair according to any method described hereinabove so as to obtain a pair of rectifying transformations. The apparatus may further process one or more image pairs using the obtained rectifying transformations.

The apparatus 31 comprises a programmable data processor 32 with a program memory 33, for instance in the form of a read only memory (ROM), storing a program for controlling the data processor 32 to process acoustic data by a method of the invention. The apparatus further comprises non-volatile read/write memory 34 for storing, for example, any data which must be retained in the absence of a power supply. A "working" or "scratch pad" memory for the data processor is provided by a random access memory RAM 35. An input device 36 is provided, for instance for receiving user commands and data. An output device 37 is provided, for instance, for displaying information relating to the progress and result of the processing. The output device may be, for example, a printer, a visual display unit, or an output memory.

Image pairs for processing may be supplied via the input device 36 or may optionally be provided by a machine-readable store 38, The determined rectifying transformations may be output via the output device 37, or may be stored. Alternatively, once a pair of rectifying transformations have been determined the apparatus may process one or more image pairs using the rectifying transformations. The rectified image pairs maybe output, for example for display, via the output device 37 or may be stored.

The program for operating the system and for performing the method described herein before is stored in the program memory 33, which may be embodied as a semiconductor memory, for instance of the well known ROM type. However, the program may well be stored in any other suitable storage medium, such as a magnetic data carrier 33a (such as a "floppy disc") or a CD-ROM 33b.

What is claimed is:

1. A method of rectifying a stereoscopic image comprising first and second images captured using a respective one of first and second image capture devices, the first and second image capture devices forming a stereoscopic image capture device, the method comprising the step of:

determining first and second rectification transformations for rectifying a respective one of the first and second images so as to reduce vertical disparity;

characterised in that the method comprises using statistical probability analysis of the parameters of the stereoscopic image capture device in the determination of the first and/or second rectification transformations.

2. A method as claimed in claim 1 wherein each rectification transformation comprises a horizontal shear and scaling component, and the statistics of the parameters of the stereoscopic image capture device are used in the determination of the horizontal shear and scaling component of the first and/or second rectification transformation.

3. A method as claimed in claim 1 and comprising the steps of:

determining the first and second rectification transformations; varying the statistics of the parameters of the stereoscopic image capture device;

re-determining the first and second rectification transformations; and rectifying the first and second images using a respective one of the re-determined first and second rectification transformations.

4. A method as claimed in claim 3 and comprising the further steps of:

rectifying at least part of the first image and at least part of the second image using a respective one of the initially-determined first and second rectification transformations; and displaying the rectified parts of the first and second images on a stereoscopic display device.

5. A method as claimed in claim 4 and comprising the further steps of:

rectifying at least part of the first image and at least part of the second image using a respective one of the initially-determined first and second rectification transformations;

displaying the rectified parts of the first and second images on the stereoscopic display device; and varying the statistics of the parameters of the stereoscopic image capture device on the basis of the display of the rectified parts of the first and second images.

6. A method as claimed in claim 1 wherein the statistics of the parameters of the stereoscopic image capture device relate to parameters of the first image capture device and/or to parameters of the second image capture device.

7. A method as claimed in claim 6 wherein the statistics of the parameters of the stereoscopic image capture device comprise the mean of the focal length of the first and second image capture devices.

8. A method as claimed in claim 6 wherein the statistics of the parameters of the stereoscopic image capture device comprise the standard deviation of the focal length of the first and second image capture devices.

9. A method as claimed in claim 6 wherein the statistics of the parameters of the stereoscopic image capture device comprise the mean of the principal point of the first and second image capture devices.

10. A method as claimed in claim 6 wherein the statistics of the parameters of the stereoscopic image capture device comprise the standard deviation of the principal point of the first and second image capture devices.

11. A method as claimed in claim 1 wherein the statistics of the parameters of the stereoscopic image capture device relate to the alignment of the first image capture device relative to the second image capture device.

12. A method as claimed in claim 11 wherein the statistics of the parameters of the stereoscopic image capture device comprise the mean of the rotation of the optical axis of the first image capture device relative to the optical axis of the second image capture device.

13. A method as claimed in claim 11 wherein the statistics of the parameters of the stereoscopic image capture device comprise the standard deviation of the rotation of the optical axis of the first image capture device relative to the optical axis of the second image capture device.

14. A method as claimed in claim 1 wherein the first and second rectification transformations are determined so as correspond to a virtual alignment to a parallel camera set-up.

15. A method as claimed in claim 1 wherein the first captured image and second captured image comprise a still stereoscopic image.

16. A method as claimed in claim 1 wherein the first captured image and second captured image comprise a frame of a stereoscopic video image.

17. A method as claimed in claim 16 and comprising the steps of: determining first and second rectification transformations for a first frame of the stereoscopic video image using a method as defined in claim 1; and rectifying subsequent frames of the stereoscopic video image using the first and second rectification transformations determined for the first frame of the stereoscopic video image.

18. A method as claimed in claim 16 and comprising the steps of: determining first and second rectification transformations for a first frame of the stereoscopic video image using a method as defined in claim 1;

rectifying first to Nth frames of the stereoscopic video image using the first and second rectification transformations determined for the first frame of the stereoscopic video image;

determining first and second rectification transformations for an (N4+1)th frame of the stereoscopic video image using a method as defined in claim 1; and rectifying (N+1)th to (2N)th frames of the stereoscopic video image using the first and second rectification transformations determined for the (N+1)th frame of the stereoscopic video image.

19. A method as claimed in claim 16 and comprising the steps of: determining first and second rectification transformations for each frame of the stereoscopic video image using a method as defined in claim 1; and rectifying each frame of the stereoscopic video image using the first and second rectification transformations determined for that frame.

20. A method as claimed in claim 1 and comprising the further step of rectifying the first and second captured images using a respective one of the first and second rectification transformations.

21. A method as claimed in claim 20 and comprising the further step of displaying the first and second rectified images on a stereoscopic display device for viewing by an observer.

22. A method of rectifying a stereoscopic image comprising first and second images captured using first and second image capture devices, the first and second image capture devices forming a stereoscopic image capture device, the method comprising the step of:

determining first and second rectification transformations for rectifying a respective one of the first and second images so as to reduce vertical disparity;

characterised in that the method comprises determining the first and second rectification transformation so that the first and second rectification transformations correspond to a virtual alignment to a parallel camera set-up, wherein determining the first and second rectification transformation includes calculating a shear component such that a final matrix is a combination of a rotation and a translation and at least one internal camera parameter.

23. A method as claimed in claim 22 and further comprising the step of using statistical probability analysis of the parameters of the stereoscopic image capture device in the step of determining the first and second rectification transformations.

24. A method as claimed in claim 23 wherein the statistics of the parameters of the stereoscopic image capture device relate to the alignment of the first image capture device relative to the second image capture device.

25. A method as claimed in claim 22 wherein the step of determining the first and second rectification transformations comprises:
   determining a first component of each of the first and second rectification transformations, the first component of the first rectification transformation and the first component of the second rectification transformation substantially eliminating vertical disparity from the rectified image pair; and
   determining a second component of each of the first and second rectification transformations so that the first and second rectification transformations correspond to a virtual alignment to a parallel camera set-up.

26. A method as claimed in claim 25 and further comprising the step of using statistics of the parameters of the stereoscopic image capture device in the step of determining the first and second rectification transformations wherein the statistics of the parameters of the stereoscopic image capture device are used in the step of determining the second components of the first and second rectification transformations.

27. A method as claimed in claim 25 wherein the statistics of the parameters of the stereoscopic image capture device relate to the alignment of the first image capture device relative to the second image capture device.

28. A method as claimed in claim 22 wherein the first captured image and second captured image comprise a still stereoscopic image.

29. A method as claimed in claim 22 wherein the first captured image and second captured image comprise a frame of a stereoscopic video image.

30. A method as claimed in claim 29 and comprising the steps of:
   determining first and second rectification transformations for a first frame of the stereoscopic video image using a method as defined in claim 22; and
   rectifying subsequent frames of the stereoscopic video image using the first and second rectification transformations determined for the first frame of the stereoscopic video image.

31. A method as claimed in claim 29 and comprising the steps of: determining first and second rectification transformations for a first frame of the stereoscopic video image using a method as defined in claim 22;
   rectifying first to Nth frames of the stereoscopic video image using the first and second rectification transformations determined for the first frame of the stereoscopic video image;
   determining first and second rectification transformations for an (N+1)th frame of the stereoscopic video image using a method as defined in claim 22; and
   rectifying (N1)th to (+2N)th frames of the stereoscopic video image using the first and second rectification transformations determined for the (N+1)th frame of the stereoscopic video image.

32. A method as claimed in claim 29 and comprising the steps at determining first and second rectification transformations for each frame of the stereoscopic video image using a method as defined in claim 22; and rectifying each frame of the stereoscopic video image using the first and second rectification transformations determined for that frame.

33. A method as claimed in claim 22 and comprising the further step of rectifying the first and second captured images using a respective one of the first and second rectification transformations.

34. A method as claimed in claim 33 and comprising the further step of displaying the first and second rectified images on a stereoscopic display device for viewing by an observer.

35. An apparatus for rectifying a stereoscopic image comprising first and second images captured using a respective one of first and second image capture devices, the first and second image capture devices forming a stereoscopic image capture device, the apparatus comprising:
   means for determining first and second rectification transformations for rectifying a respective one of the first and second images so as to reduce vertical disparity using statistical probability analysis of the parameters of the stereoscopic image capture device in the determination of the first and/or second rectification transformations.

36. An apparatus as claimed in claim 35 and further comprising means for rectifying the first and second captured images using a respective one of the first and second rectification transformations.

37. An apparatus as claimed in claim 35 and comprising a programmable data processor.

38. A storage medium containing a program for the data processor of an apparatus as defined in claim 37.

39. An apparatus for rectifying a stereoscopic image comprising first and second images captured using first and second image capture devices, the first and second image capture devices forming a stereoscopic image capture device, the apparatus comprising:
   means for determining first and second rectification transformations for rectifying a respective one of the first and second images so as to reduce vertical disparity, the first and second rectification transformations corresponding to a virtual alignment to a parallel camera set-ups wherein determining the first and second rectification transformation includes calculating a shear component such that a final matrix is a combination of a rotation and a translation and at least one internal camera parameter.

40. An apparatus as claimed in claim 39 and further comprising means for rectifying the first and second captured images using a respective one of the first and second rectification transformations.

41. An apparatus as claimed in claim 39 and comprising a programmable data processor.

42. A storage medium containing a program for the data processor of an apparatus as defined in claim 41.

* * * * *